United States Patent
Sekiguchi et al.

(10) Patent No.: US 7,126,612 B2
(45) Date of Patent: Oct. 24, 2006

(54) IMAGE PROCESSING APPARATUS, IMAGE PROCESSING METHOD, PROGRAM, AND STORAGE MEDIUM

(75) Inventors: Kenzou Sekiguchi, Tokyo (JP); Yushi Matsukubo, Tokyo (JP); Hiroyuki Yaguchi, Tokyo (JP); Eiichi Nishikawa, Tokyo (JP); Hiroyuki Tsuji, Tokyo (JP); Shinichi Kato, Tokyo (JP); Masakazu Kitora, Tokyo (JP); Hiroyoshi Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 10/953,150

(22) Filed: Sep. 28, 2004

(65) Prior Publication Data

US 2005/0068331 A1    Mar. 31, 2005

(30) Foreign Application Priority Data

Sep. 29, 2003    (JP)    ............................. 2003-337980

(51) Int. Cl.
*G09G 5/02* (2006.01)

(52) U.S. Cl. .................................................... 345/589

(58) Field of Classification Search ................. 345/16, 345/589, FOR. 111, 155, 172; 348/130, 348/133, 134, 138; 382/253; 704/222; 712/2–7, 712/222

See application file for complete search history.

(56) References Cited

U.S. PATENT DOCUMENTS 6,088,469 A    7/2000   Fukumura et al.
6,389,162 B1   5/2002   Maeda
6,396,947 B1 * 5/2002   Doll ............................ 382/162
2002/0087602 A1 7/2002 Masuda et al.

FOREIGN PATENT DOCUMENTS

| JP | 62-024372 A | 2/1987 |
|----|-------------|--------|
| JP | 62-024373 A | 2/1987 |
| JP | 8-237681 A  | 9/1996 |
| JP | 9-289586 A  | 11/1997 |
| JP | 10-151591 A | 6/1998 |
| JP | 2002-91949 A | 3/2002 |
| JP | 2002-131133 A | 5/2002 |
| JP | 2002-163650 A | 6/2002 |
| JP | 2002-170123 A | 6/2002 |

* cited by examiner

*Primary Examiner*—Kee M. Tung
*Assistant Examiner*—G. F. Cunningham
(74) *Attorney, Agent, or Firm*—Canon U.S.A. Inc. IP Division

(57) ABSTRACT

An image processing system and method includes selecting a color desired by a user, extracting a partial image corresponding to the color desired by the user and selected from a bit-map image, converting the partial image into vector data, storing the vector data in a memory, and setting the converted vector data as vector data to be processed as desired by the user. The image processing system and method further includes calculating a palette color from the bit-map image, extracting a partial image corresponding to the palette color, converting the partial image into vector data per color object, storing the vector data in a memory, and setting, as vector data to be processed as desired by the user, vector data per object that is selected from the vector data stored in the memory based on the color selected from the calculated palette colors.

23 Claims, 28 Drawing Sheets

FIG. 16

| NO. | BOX NAME | DOC |
|---|---|---|
| 01 | TOKYO | 0 |
| 02 | OSAKA | 39 |
| 03 | NAGOYA | 5 |
| 04 | FUKUOKA | 999 |
| 05 | SENDAI | 3 |
| 06 | NEWYORK | 21 |
| 07 | BEIJING | 39 |

BOX LIST

1601 — BOX LIST
1602 — NO.
1603 — BOX NAME
1604 — DOC
1605 — 03 NAGOYA 5

FIG. 17

| NO. | TYPE | NAME | AUTHOR | DATE / TIME | PAGES |
|---|---|---|---|---|---|
| 01 | JPEG | AAAA | XXXXX | 05/20 '03 11:11 | 34 |
| 02 | TIFF | BBBB | XXXXX | 05/20 '03 11:22 | 1 |
| 03 | JPEG | CCCC | XXXXX | 05/20 '03 11:33 | 7 |
| 04 | VECT | DDDD | XXXXX | 05/20 '03 11:44 | 99 |
| 05 | TIFF | EEEE | XXXXX | 05/20 '03 11:55 | 5 |

1701 — DOCUMENT LIST (NAGOYA)
1702: NO.
1703: TYPE
1704: NAME
1705: AUTHOR
1706: DATE / TIME
1707: PAGES
1708: (row 03 highlighted)

FIG. 18

1801 — DOCUMENT LIST (NAGOYA)

| NO. | TYPE | NAME | AUTHOR | DATE / TIME | PAGES |
|---|---|---|---|---|---|
| 01 | JPEG | AAAA | XXXXX | 05/20 '03 11:11 | 34 |
| 02 | TIFF | BBBB | XXXXX | 05/20 '03 11:22 | 1 |
| 03 | JPEG | CCCC | XXXXX | 05/20 '03 11:33 | 7 |
| 04 | VECT | DDDD | XXXXX | 05/20 '03 11:44 | 99 |
| 05 | TIFF | EEEE | XXXXX | 05/20 '03 11:55 | 5 |
| 06 | VECT | CCCC | XXXXX | 05/20 '03 12:11 | 7 |

| SUBSTITUTE COLOR | ~2101 |

| COLOR | ~2102 |

2103

☐ BLACK  ☐ RED  ☐ GREEN  ■ BLUE

FIG. 23A

BLOCK INFORMATION

| | ATTRIBUTE | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | PRESENT |
| BLOCK 2 | 3 | X2 | Y2 | W2 | H2 | PRESENT |
| BLOCK 3 | 2 | X3 | Y3 | W3 | H3 | ABSENT |
| BLOCK 4 | 1 | X4 | Y4 | W4 | H4 | PRESENT |
| BLOCK 5 | 3 | X5 | Y5 | W5 | H5 | PRESENT |
| BLOCK 6 | 5 | X6 | Y6 | W6 | H6 | ABSENT |

*ATTRIBUTE  1:text  2:picture  3:table  4:line  5:photo

FIG. 23B

INPUT FILE INFORMATION

| TOTAL NO. OF BLOCKS | N(=6) |
|---|---|

FIG. 24

| | SYNTHESIS FLAG | BLOCK NO. | COLOR TYPE | COLOR | OBJECT DATA PRINTER |
|---|---|---|---|---|---|
| OBJECT 1 | | BLOCK 1 | CALCULATED PALETTE COLOR | PALETTE 1 | ODP 1 |
| OBJECT 2 | | BLOCK 2 | CALCULATED PALETTE COLOR | PALETTE 2 | ODP 2 |
| OBJECT 3 | | BLOCK 2 | CALCULATED PALETTE COLOR | PALETTE 3 | ODP 3 |
| OBJECT 4 | | BLOCK 3 | CALCULATED PALETTE COLOR | PALETTE 1 | ODP 4 |
| ... | | ... | ... | ... | ... |
| OBJECT xx | | BLOCK 6 | — | — | ODP xx |

FIG. 25

| | TYPE | CONTENT | VECTOR OBJECT |
|---|---|---|---|
| OD 1 | CHARACTER STRING | "Sheet AAA" | V01 |
| OD 2 | CHARACTER STRING | [0, 0] "name", [1, 0] "address", [2, 0] "type" | V02 |
| OD 3 | CHARACTER STRING | [2, 1][0, 0] "A", [2, 1][1, 0] "B" | V03 |
| | | ⋮ | |
| OD xx | IMAGE FILE | "abc.jpg" | — |

```
<?xml version="1.0" standalone="no" ?>
<!DOCTYPE svg PUBLIC "-//W3C//DTD SVG 20010904//EN"
"http://www.w3.org/TR/2001/REC-SVG-20010904/DTD/svg10.dtd">
<svg width="12cm" height="14cm">
<circle cx="6cm" cy="7cm" r="4cm" fill="none" stroke="blue"/>
</svg>
```

IMAGE PROCESSING APPARATUS, IMAGE PROCESSING METHOD, PROGRAM, AND STORAGE MEDIUM

CROSS REFERENCE TO RELATED APPLICATIONS

This application claims priority from Japanese Patent Application No. 2003-337980 filed Sep. 29, 2003, which is hereby incorporated by reference herein.

BACKGROUND OF THE INVENTION

1. Field of the Invention

The present invention relates to an image processing technique for converting a bit-map image having a plurality of colors into vector data.

2. Description of the Related Art

Paperless offices are now becoming common as environmental problems draw more attention. Image processing systems capable of achieving a paperless office system are now becoming commercially available. For example, in one system, a scanner is used to scan paper documents, and then the scanned data is converted into portable document format (PDF) for storage. An example of such a system is disclosed in Japanese Patent Laid-Open No. 2002-91949 (corresponding US patent Application Publication No. 2002/0087602 A1).

Japanese Patent Laid-Open No. 9-289586 (corresponding U.S. Pat. No. 6,389,162 B2) discloses another system. To enhance the efficiency of encoding in the transmission and storage of image data, noise occurring in the background of an image to be processed is removed, and the color of characters and figures is automatically quantized. The characters are then character coded in optical character recognition (OCR), and the figures are vectorized. This technique disclosed in Japanese Patent Laid-Open No. 9-289586 enhances the coding efficiency of an image by automatically quantizing color.

However, a user may wish to extract only a desired colored portion of an image for efficiency purposes. It is known that many conventional image processing systems are unsuitable for this task.

For example, the user may wish to first scan and reuse an examination sheet that has been graded or corrected with a red pen. The problem and answer sections of the examination sheet will typically be marked-up with the red pen. To reuse the examination sheet data, the problem portion must be extracted without the answer section and without portions marked-up in red. If the image is merely segmented into rectangular area for each object, the problem and marked-up section are extracted together without separation.

SUMMARY OF THE INVENTION

Various features and advantages of the present invention can be found. The image processing system and method of the present invention converts a bit-map image into vector data, wherein vector data of an object of color desired by a user is easily extracted and used.

Another advantage of the present invention is that it is capable of substituting a color desired by the user for a color of the vector data extracted from the bit-map image.

It is yet another advantage of the present invention in that it provides a user interface for easily extracting and using an object of a color desired by the user as the vector data.

Various aspects of the present invention can also be found. According to a first aspect of the present invention, an image processing system for converting a bit-map image of a plurality of colors into vector data, includes a selecting unit for selecting a color desired by a user in response to an instruction from the user, an extracting unit for extracting a partial image, corresponding to the selected color, from the bit-map image, a vectorization unit for converting the extracted partial image into vector data per color object to store the vector data onto a memory unit, and a control unit for controlling the vector data per color object, stored in the vectorization unit, to vector data desired by the user.

According to a second aspect of the present invention, an image processing system for converting a bit-map image of a plurality of colors into vector data, includes a palette color calculating unit for calculating a palette color based on the bit-map image, an extracting unit for extracting a partial image, corresponding to the calculated palette color, from the bit-map image, a vectorization unit for converting the extracted partial image into vector data per color object to store the vector data onto a memory unit, a selecting unit for selecting a color, desired by a user in response to an instruction from the user, from the calculated palette colors, and a control unit for controlling the vector data per object, selected from the vector data stored in the vectorization unit based on the color selected by the selecting unit, to vector data as desired by the user.

According to a third aspect of the present invention, an image processing system for converting a bit-map image of a plurality of colors into vector data, includes a determining unit for determining whether a selection command for selecting a color desired by a user or a calculation command for calculating a palette color is issued in response to an instruction from the user, an extracting unit which extracts a partial image, corresponding to the selected color desired by the user, from the bit-map image if the determining unit determines that the selection command for selecting the color desired by the user has been issued, or calculates the palette color based on the bit-map image and extracts a partial image, corresponding to the calculated palette color, from the bit-map image if the determining unit determines that the calculation command for calculating the palette color has been issued, a vectorization unit for converting the partial image extracted by the extracting unit into vector data per color object to store the vector data onto a memory unit, a selecting unit for selecting, from the calculated palette colors, the color desired by the user in response to an instruction from the user if the determining unit determines that the calculation command for calculating the palette color has been issued, and a control unit which controls the vector data per color object, converted by the vectorization unit, to vector data to be processed as desired by the user, if the determining unit determines that the selection command for selecting the color desired by the user has been issued, or controls, to vector data desired by the user, vector data per object selected from the vector data stored by the vectorization unit based on the color selected by the selecting unit if the determining unit determines that the calculation command for calculating the palette color has been issued.

The information processing system of embodiments of the present invention for converting a bit-map image into vector data generates the vector data accounting for color difference, and extracts an object having a color desired by a user as the vector data. The information processing system provides the ease of use.

The information processing system of the embodiments of the present invention also generates the vector data with color substituted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 16 illustrates an example of box list screen in accordance with an embodiment of the present invention.

FIG. 17 illustrates an example of a document list screen in accordance with an embodiment of the present invention.

FIG. 18 illustrates an example of the document list screen in accordance with an embodiment of the present invention.

FIG. 21 illustrates a substitute color selection screen in accordance with an embodiment of the present invention.

FIGS. 23A and 23B illustrate a block information table in accordance with an embodiment of the present invention.

FIG. 24 illustrates a color-based object management table in accordance with an embodiment of the present invention.

FIG. 25 illustrates an object data table in accordance with an embodiment of the present invention.

DETAILED DESCRIPTION OF THE EMBODIMENTS

Figure 1:
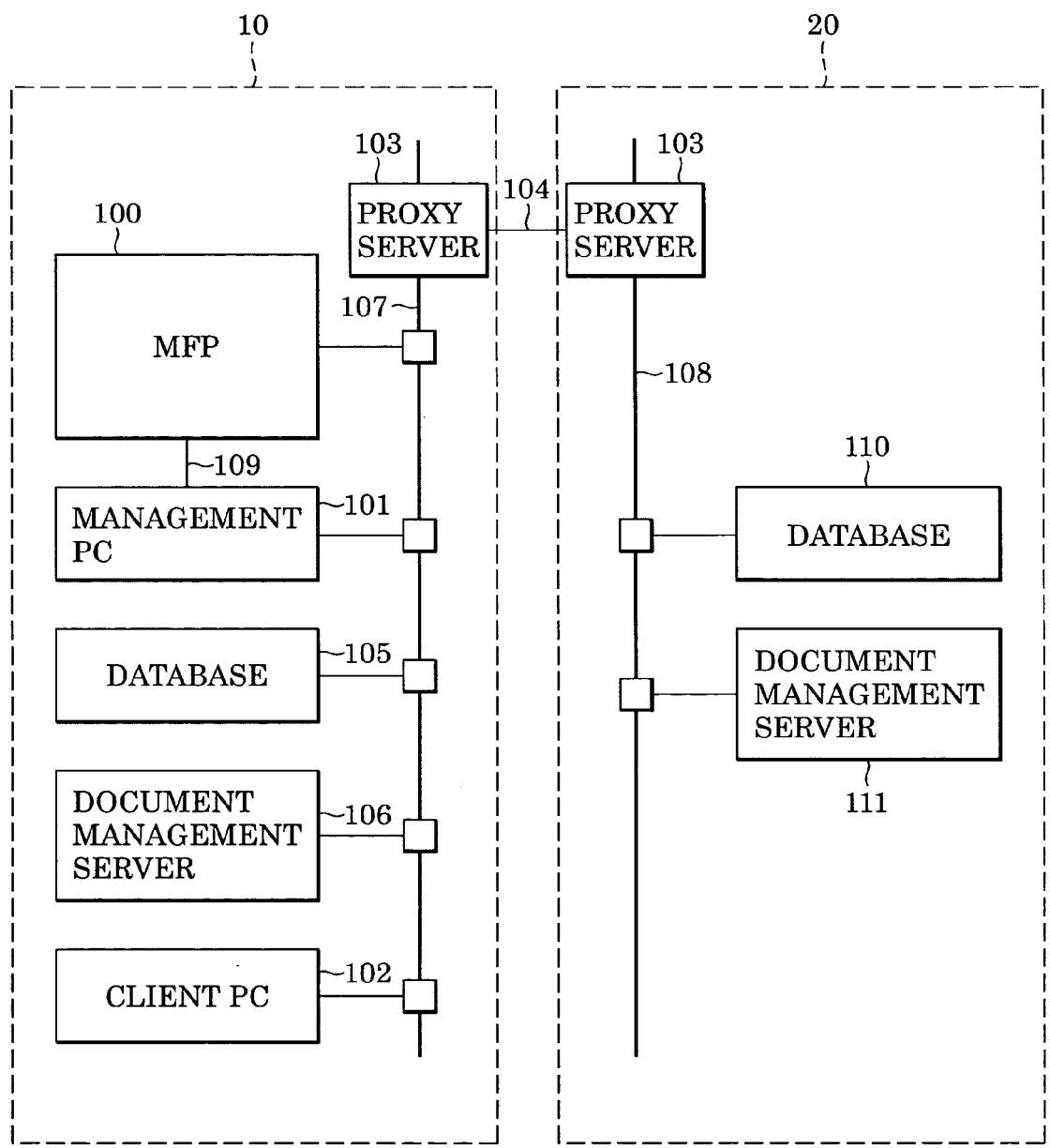
FIG. 1 illustrates an image processing system for performing an image processing method in accordance with an embodiment of the present invention.

The embodiments of the present invention are described below. FIG. 1 illustrates an image processing system for performing an image processing method in accordance with an embodiment of the present invention. As shown, the image processing system includes an office 10 linked to an office 20 via the Internet 104.

Connected to a local area network (LAN) 107 installed in the office 10 are a multi-function printer (MFP) 100, a management PC 101, a client PC 102, a document management server 106, a database 105, and a proxy server 103. The LAN 107 is connected to an LAN 108 through a proxy server 103 via the Internet 104. The LAN 108 is connected to a document management server 111 and a database 110.

The MFP 100 performs an image reading process of a paper document and a partial image process on the read image signal in accordance with the embodiment of the present invention. The image signal is fed to the management PC 101 via the LAN 109. The management PC 101 is a conventional PC having an image storage unit, an image processor, a display, and an input unit. A portion of the management PC 101 is integrated with the MFP 100. Alternatively, all functions of the management PC 101 may be integrated into the MFP 100.

Figure 2:
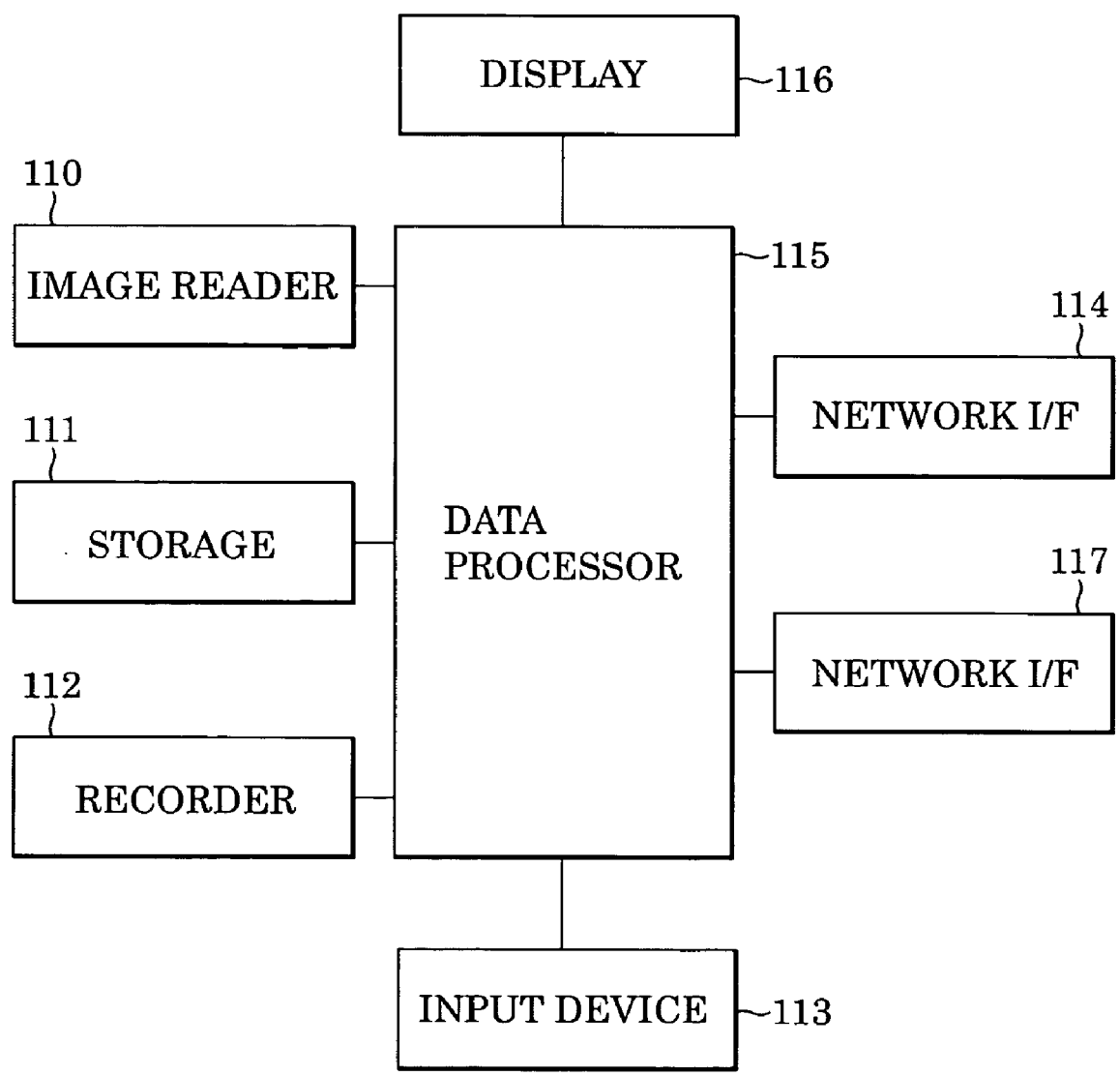
FIG. 2 illustrates an MFP (Multi-Function Printer) of the image processing system of FIG. 1.

FIG. 2 illustrates the structure of the MFP 100. As shown, in an image reader 110 including an auto-document feeder (ADF), a light source illuminates a single sheet or a stack of original documents. A document image reflected from the document is focused on a solid-state image pickup device through a lens. A raster image signal from the solid-state image pickup device is thus acquired as image information (bit-map image) at a density of 600 DPI. During copying, the image signal is converted into a recording signal by a data processor 115. In the case of a plurality of copies, a single page of data is stored in the storage 111, and the stored data is then successively output to the recorder 112 to be recorded onto a sheet of paper.

Print data output from the client PC 102 is supplied to the data processor 115 via the LAN 107 and network interface 114. The data processor 115 converts the print data to raster data in a recordable format, and the recorder 112 records the data on a sheet of paper.

Operator instructions to the MFP 100 are input through an input device 113 such as keyboard connected to the MFP 100, and an input device such as a keyboard connected to the management PC 101. A series of operations is controlled by a controller (not shown) in the data processor 115.

The data processor 115, including a CPU, an ROM, an RAM, stores control programs and data.

A display 116 displays inputs from the input device and image data under process. The storage 111 is controlled by the management PC 101. Exchange of data and control signals between the MFP 100 and the management PC 101 are performed via the network interface 117 and the LAN 109 that directly connect both units.

The image processing method of the embodiment of the present invention performed in the image processing system of FIG. 1 is discussed below with reference to FIGS. 3 and 4.

Figure 3:
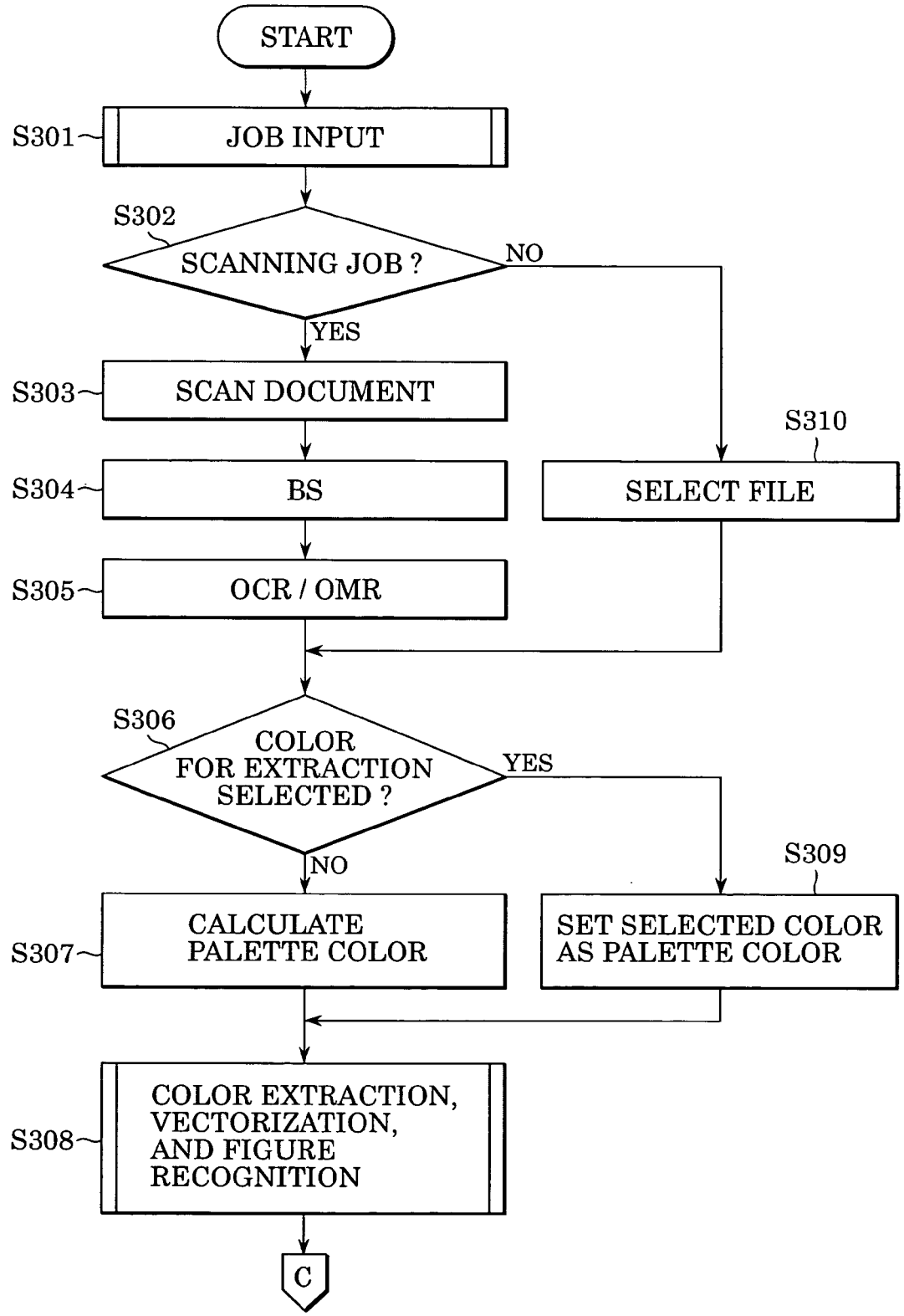
FIG. 3 is a flowchart of the process of the image processing system.

As shown in FIG. 3, a user performs a job input step to specify a job (step S301). More specifically, an image input method is selected in an image input box 802 on a job menu screen (shown in FIG. 8). Also, an output destination of an image of vector data is set in a box 807, a selection of whether to calculate a palette color and a selection of document type is input in a box 815, an extraction color is selected in a box 815 if a user directly specifies the extraction color without calculating the palette color, and a command to vectorize all objects without selecting and sorting the document is selected on the job menu screen.

Figure 8:
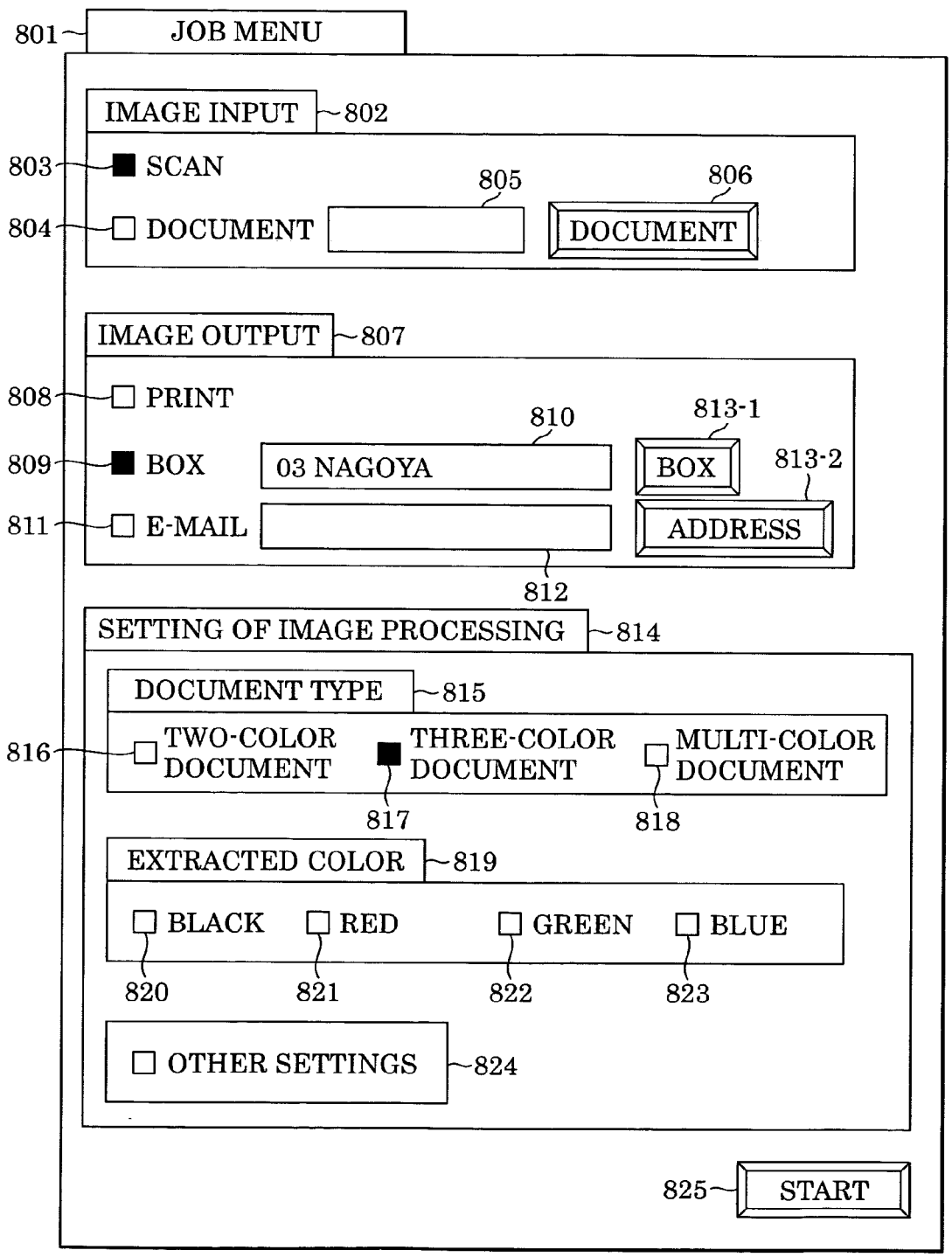
FIG. 8 illustrates a job menu screen on which a user specifies a job in accordance with an embodiment of the present invention.

In step S302, the data processor 115 checks to see if SCAN 830 is specified in the image input method on the screen of FIG. 8 in the job input step (S301). If it is determined that SCAN 803 is not specified (i.e., no), the algorithm proceeds to step S310 to select a file. In step S310, the user selects a desired one from image data files (in bit-map) stored in the storage 111.

If SCAN 803 is specified (i.e., yes), the image reader 110 in the MFP 100 operates in a document scan process (step S303). The image reader 110 raster scans a page of document, outputting a 600 DPI and 8-bit signal. The image signal is then pre-processed by the data processor 115, and the pre-processed image signal is stored in the storage 111 as one page (bit-map image) image data.

A block selection (BS) process is performed in step S304 to segment the image into areas on a per attribute basis. In the BS selection process, the image data is processed as a gray scale image. More specifically, the CPU in the management PC 101 separates a character and lineart portion and a half-tone image portion from the stored image signal. The character and lineart portion are further segmented. For example, the text is segmented into blocks on a paragraph-by-paragraph basis, and the lineart is segmented on a per table or a per drawing basis. The image portion in half-tone is segmented into rectangular blocks as objects and the background portion of the image is segmented into a block as a separate object. The BS process in step S304 is not limited the above described method. A different method may be used to segment the image into blocks per attribute.

In an OCR and OMR process in step S305, a character recognition process is performed. For characters contained in a document image, a character code, a font, location information of a character object, etc. are generated and stored in the storage 111.

It is determined in step S306 whether at least one color to be extracted is selected in response to an instruction from the user in an extracted color box 819 in a setting of image processing box 814 of FIG. 8. If a color is selected (i.e., yes), the algorithm proceeds to step S309. The selected color to be extracted is then set as a palette color. The algorithm proceeds to step S308.

If no color to be extracted is selected, the algorithm proceeds to step S307. In step S307, the number of colors is identified based on document type parameters input in the job input step (step S301) using the median cut technique and pallet calculation technique (as disclosed in Japanese Patent Laid-Open No. 2002-170123, Japanese Patent Publication No. 4-48275, and Japanese Patent Publication No. 4-67669). The result is then stored in the storage 111.

In step S308, a color extraction process, a vectorization process, and a figure recognition process are performed. In the color extraction process, a portion having a color corresponding to the palette color is extracted from the input image data based on the palette color determined in step S307 or S309. In the color extraction process, a portion considered to have a similar color (within a predetermined range in hue, saturation, and lightness from the palette color) is also extracted together to cope with color non-uniformity in scanning. In the vectorization process, vectorization is performed on a per rectangular block basis, on a per color basis, and on a per object basis. As for figures, objects are grouped as figure objects. The image data is then stored in the storage 111 in a form (see FIGS. 23, 24, and 25) that allows the data to be extracted and referenced according to rectangular block, according to color, or according to object (figure object for the figures). FIG. 24 illustrates an example of a color-based object management table when the palette color is calculated in step S307. An identifier of a "calculated palette color" is inputted for the color type attribute when the palette color is calculated in step S307. A palette number of palette colors calculated in step S307 is inputted for the color attribute. The block number of FIG. 24 is bound to block information in FIG. 23A, and an object data pointer (ODPx) of FIG. 24 is bound to ODx of FIG. 25. On the other hand, when the palette color is set in step S306, an identifier of a "selected palette color" is inputted for the color type attribute, and one of palette colors selected in the extracted color box 819 is inputted for the color attribute.

The vectorization process refers to a process of converting the image data (bit-map image) to vector data into an electronic file so that it is similar to an original electronic file. In this embodiment, the character block recognized in step S305 is further recognized by font size, style, and font. Using outline fonts, the characters obtained as a result of scanning are converted to font data visibly faithful thereto. Edges are extracted from tables and figure blocks constructed of lines, and the tables and figure blocks are then outlined. A natural image block, such as a photograph, is processed as a JPEG image data file. These vectorization processes are performed on a per object basis. Layout information of the objects is stored as an electronic file in the storage 111. The color extraction process and the vectorization process will be discussed later. A series of processes including the color extraction process, the vectorization process and the figure recognition process will also be discussed below with reference to FIG. 30.

Figure 4:
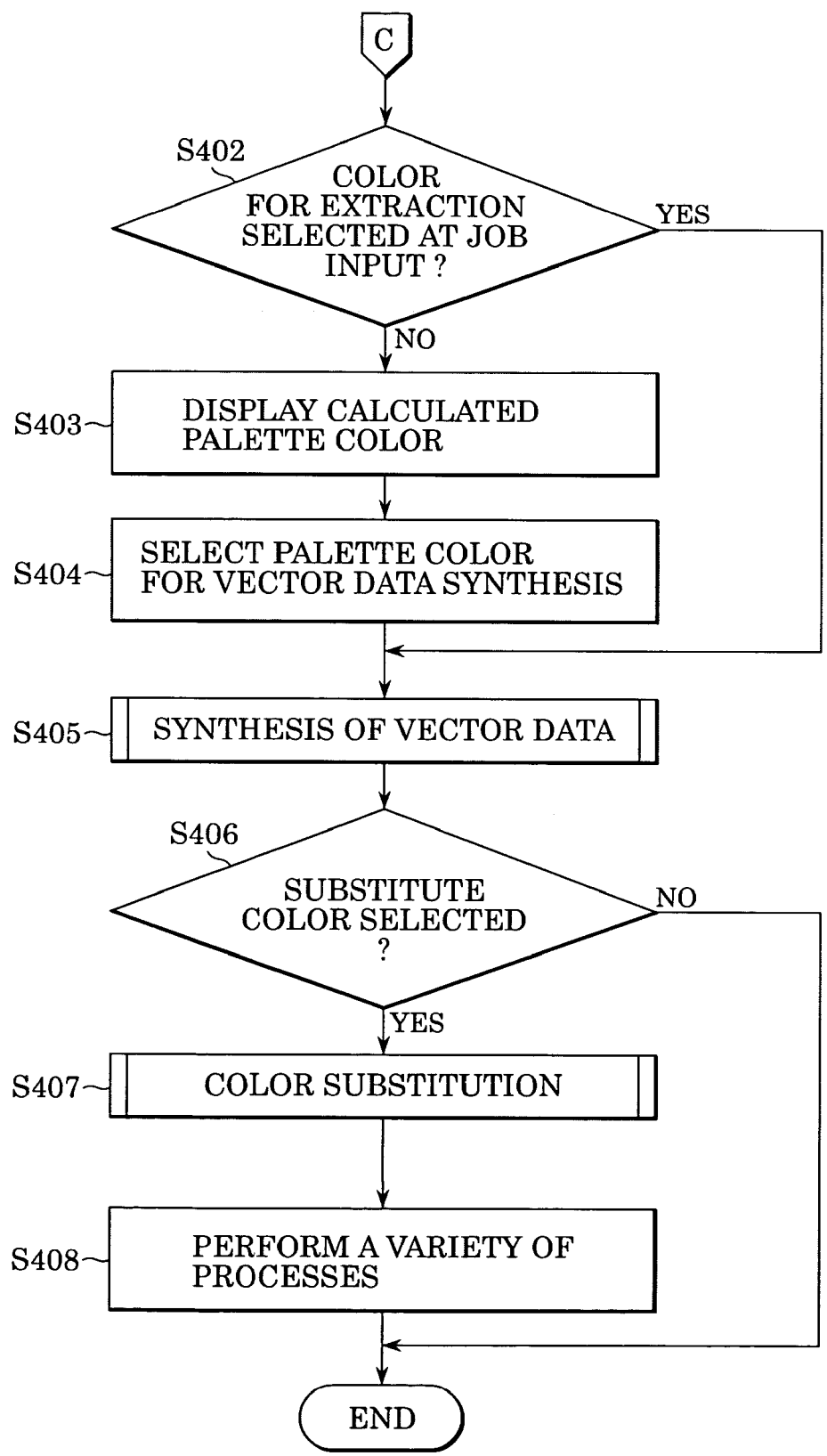
FIG. 4 is a continuation of the flowchart of FIG. 3.

The algorithm proceeds to step S402 in FIG. 4. The image processing system checks to see if at least one color is selected as an extraction color (the color in the extraction color 819 of FIG. 8) in the job input process in step S301. If a color is selected (i.e., yes), the algorithm proceeds to step S405 (skipping both step S403 for displaying calculated color palettes and step S404 for palette color selection).

Figure 19:
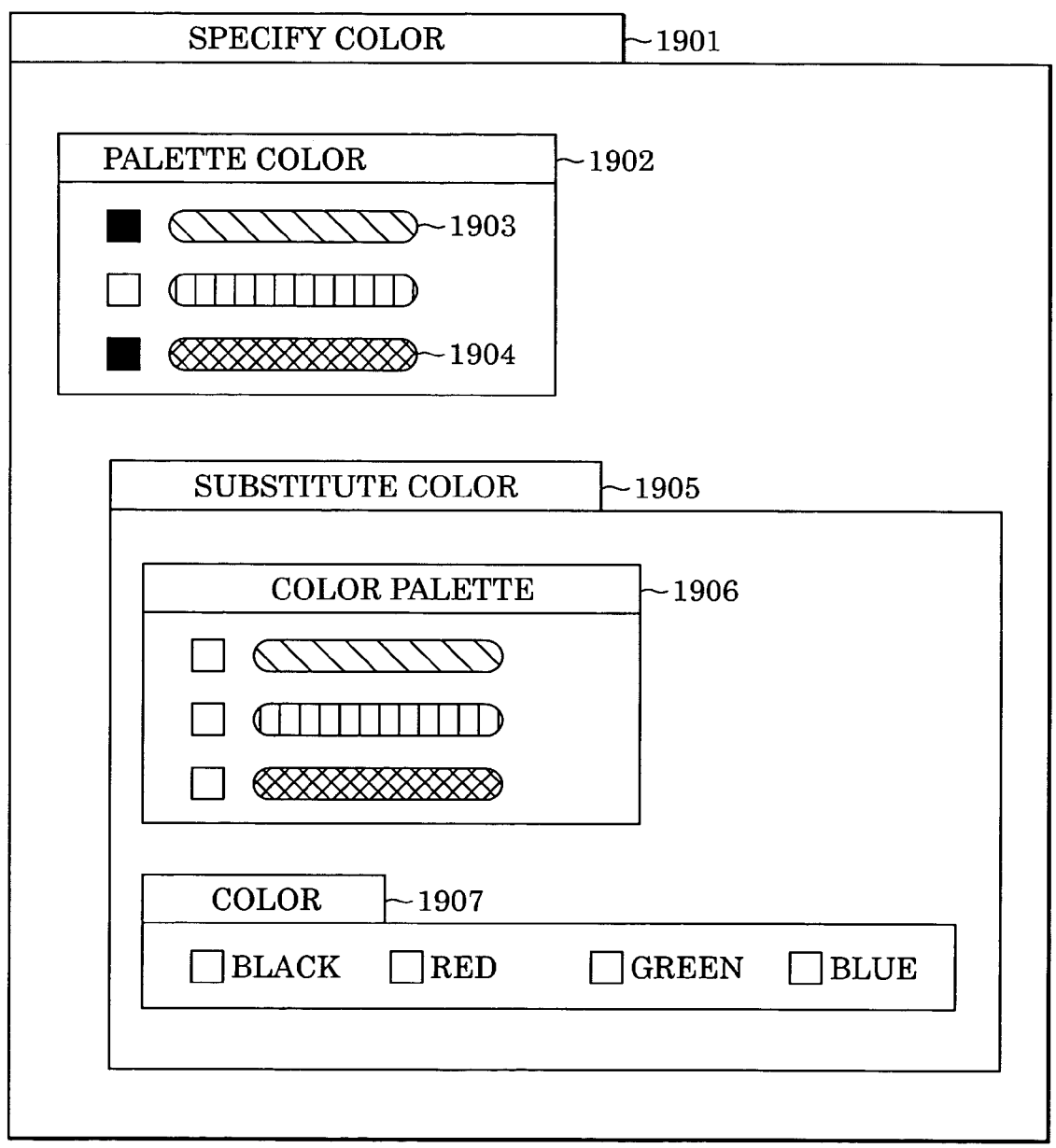
FIG. 19 illustrates a screen on which a palette color to be vector data synthesized and a substitute color are selected in accordance with an embodiment of the present invention.

If no extraction color is selected (i.e., no), the algorithm proceeds to step S403. The image processing system displays a list of palette colors calculated in step S307, a selection button for the palette colors, a list of substitute colors, and a selection button for the substitute colors (see FIG. 19). Referring to FIG. 19, the list of palette colors calculated in step S307 and the selection button therefor are represented by a box 1902, and the list of substitute colors for substituting the palette color and the selection button are represented by a box 1095. In this example, a three-color document is selected (in a box 817 in FIG. 8) at the job input, and FIG. 19 illustrates the state of the selected three palette colors.

Figure 9:
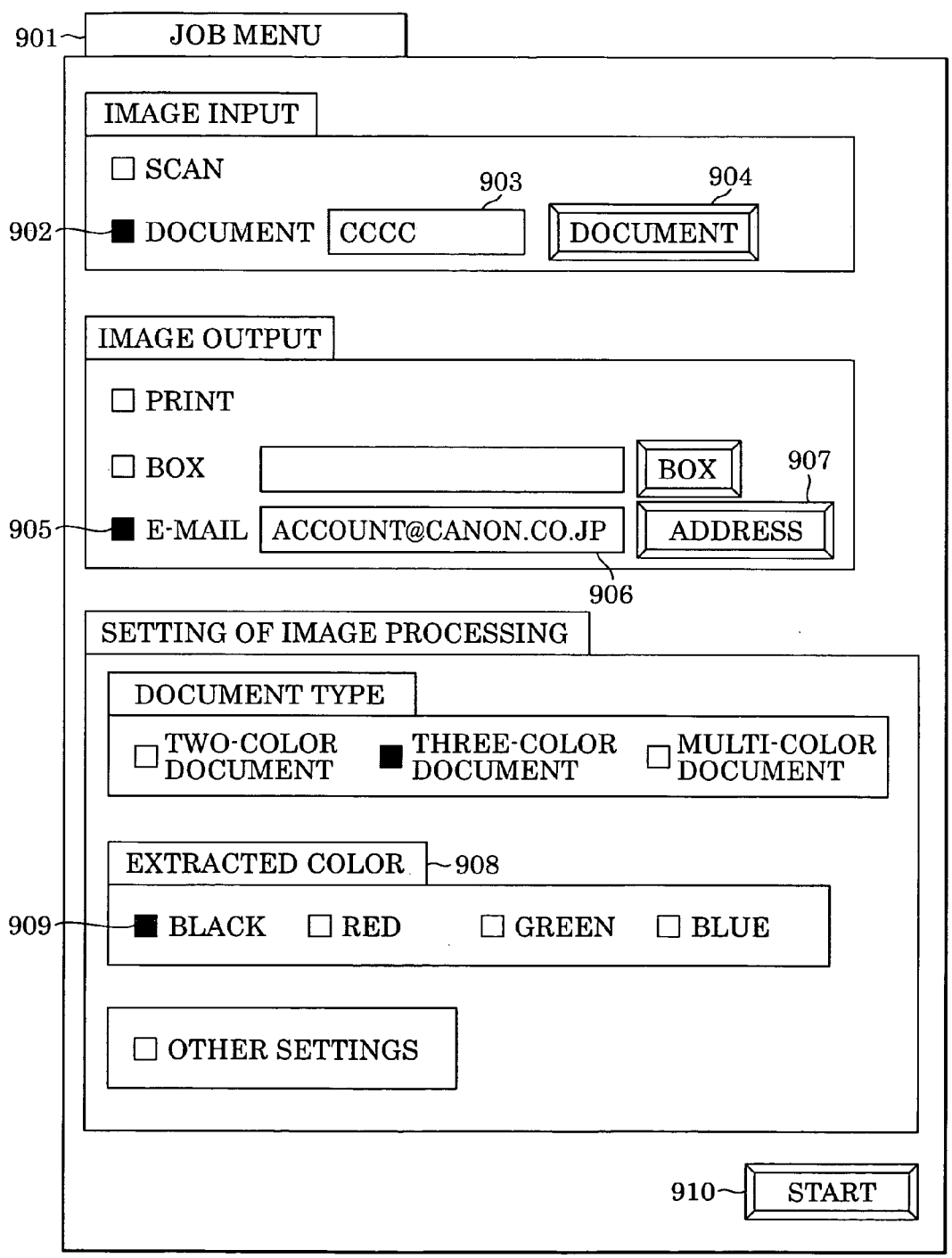
FIG. 9 illustrates a job menu screen on which the user specifies a job in accordance with an embodiment of the present invention.

In the palette color selection process in step S404, a palette color (a plurality of palette colors) is input in response to an instruction from the user, and the color to be subjected to vector data synthesis is selected. If necessary, a substitute color may also be selected. In the example of FIG. 19, two colors, namely, a color 1903 at the top and a color 1904 at the bottom are selected. Since no substitute color is selected, a color substitution process is not performed. The substitute color serves as a color which is substituted for the color of vector data which is extracted and synthesized based on the selected palette color. As shown in FIG. 19, color palette 1906 for specifying a color and a color 1907 for specifying another color are displayed to select a substitute color. If an extraction color is selected at the job input as shown in FIG. 9, a palette color selection process in step S404 is not performed. To select a substitute color, no color palette is displayed and a color 2102 is displayed as shown in FIG. 21. The substitute color is selected beforehand (no substitute color is selected when no substitution is performed).

Figure 28:
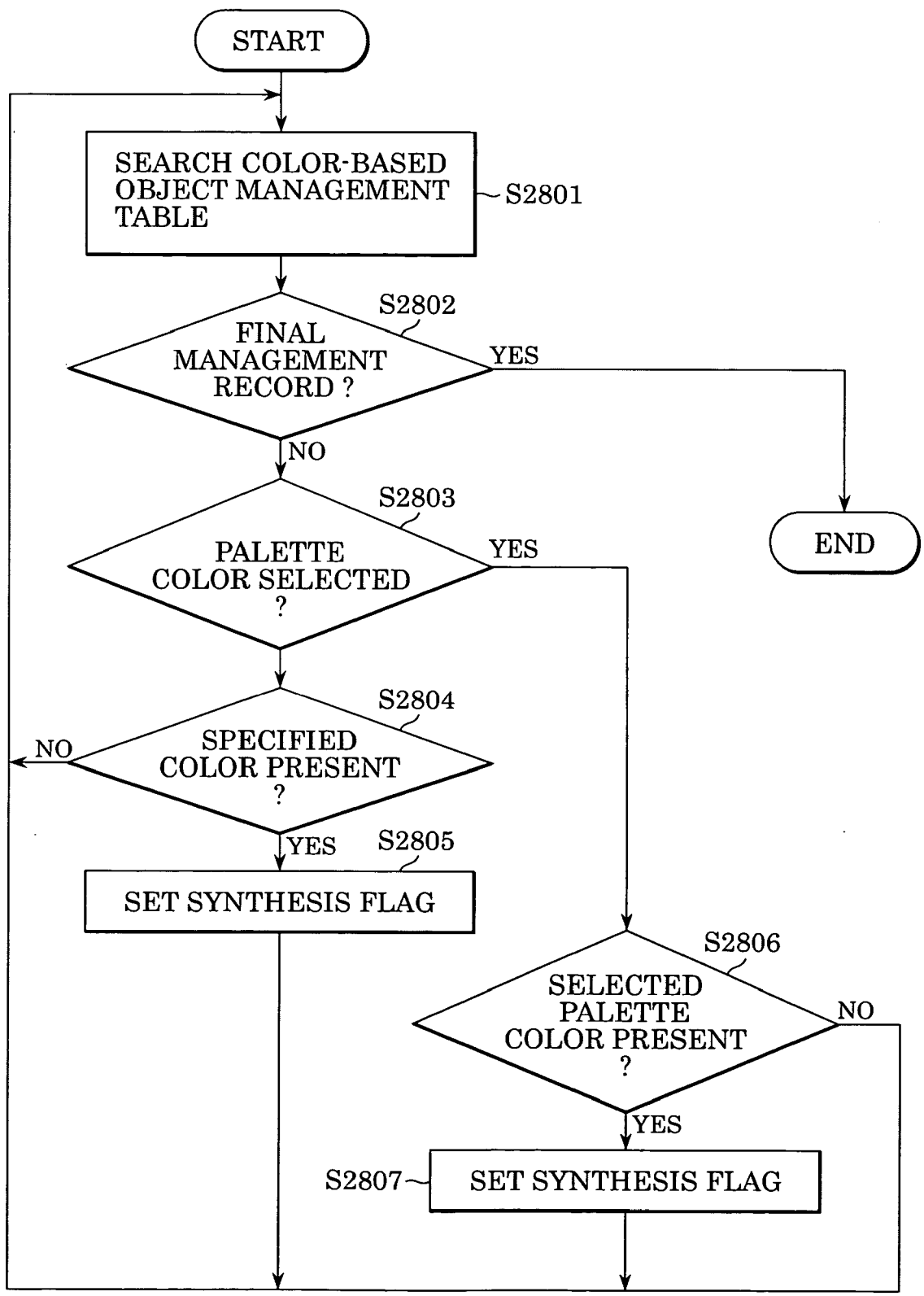
FIG. 28 is a flowchart illustrating a vector data synthesis process in accordance with an embodiment of the present invention.

In a vector data synthesis process in step S405, a synthesis flag of an object that is extracted based on the palette color selected in step S404 or the extraction color selected by the user is set to "on" in a color-based object management table (see FIG. 24) for managing the vectorized objects according to color. This process will be discussed in below with reference to the vector data synthesis process of FIG. 28.

It is then determined in step S406 whether the substitute color is selected. If no substitute color is selected (i.e., no) as shown in FIG. 19, the algorithm proceeds to step S408. If a substitute color is selected (i.e., yes), as shown in FIG. 21, the algorithm proceeds to step S407. Since blue (2103) is selected in the example of FIG. 21, all vector data is replaced with blue.

In a color substitution process in step S407, each record of the color-based object management table of FIG. 24 discussed with reference steps S308 and S405 is checked. A color type and color in a management record with a synthesis flag thereof set to "on" are replaced with the substitute color discussed with reference to step S406. In the example shown in FIG. 20, a record having a palette color selected in step S404 is replaced with a palette 2003 in the color attribute. In the example shown in FIG. 21, a record having a color attribute specified beforehand is replaced with blue. This process will be discussed in more detail with reference to the color substitution (vector data color substitution) of FIG. 29.

In various processes in step S408, vector data having a synthesis flag set to "on" is extracted and synthesized, and various processes (including editing, storage, transmission, and recording of the document) are performed. Through these processes, a portion of only colors desired by the user is extracted. In comparison with a bit-map image, the amount of information is small, storage of data is efficient, and transmission time of the data is short. When the data is recorded and displayed, the data is advantageously reproduced at a high quality level. In the present embodiment, the object in the form of the vector data after the vectorization process and the vector data synthesized and output in step S408 are described in SVG (scalable vector graphics). In the recording process, the vector data must be converted to raster image data. This conversion process will be discussed later with reference to SVG vector data of FIG. 26 and SVG figure of FIG. 27. The above-referenced process steps are performed by the management PC 101, the display, and peripheral devices. Alternatively, the above-referenced process steps may be performed by the data processor 115, the display 116, and the input device 113 of the MFP 100. Each process step will be discussed in detail below.

Figure 5:
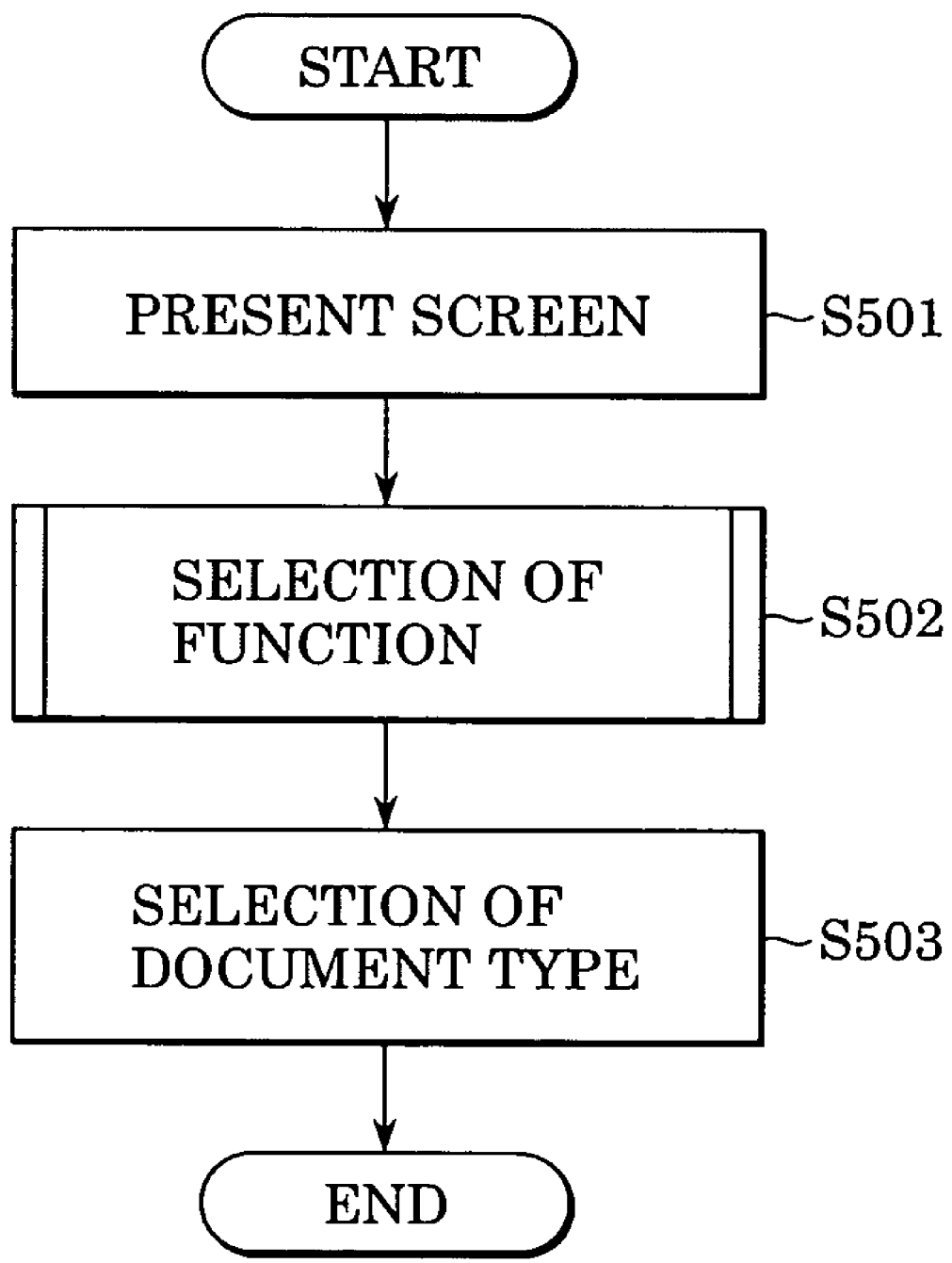
FIG. 5 is a flowchart illustrating a job input process in accordance with an embodiment of the present invention.
Figure 6:
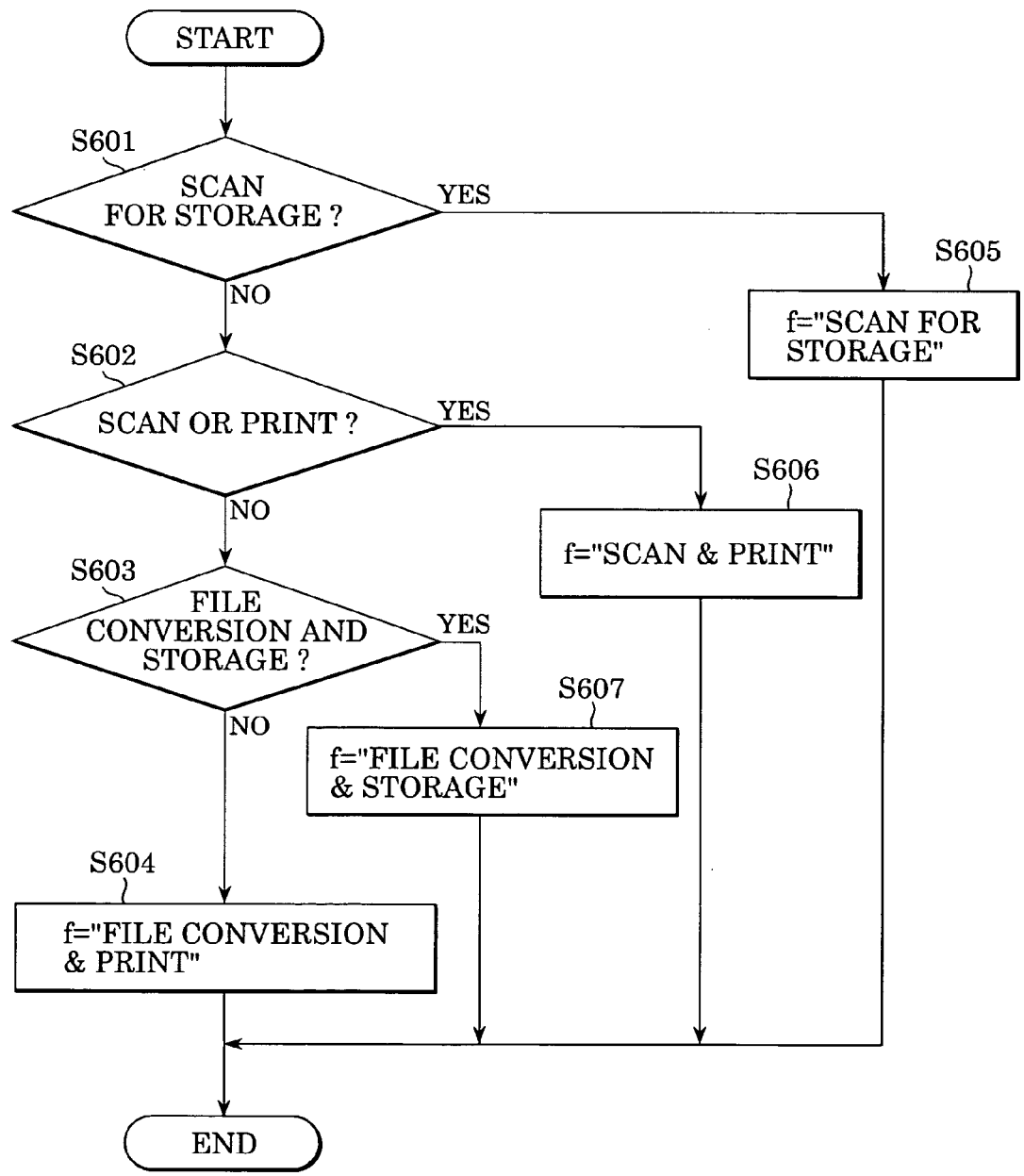
FIG. 6 is a flowchart of a function selection process in accordance with an embodiment of the present invention.
Figure 7:
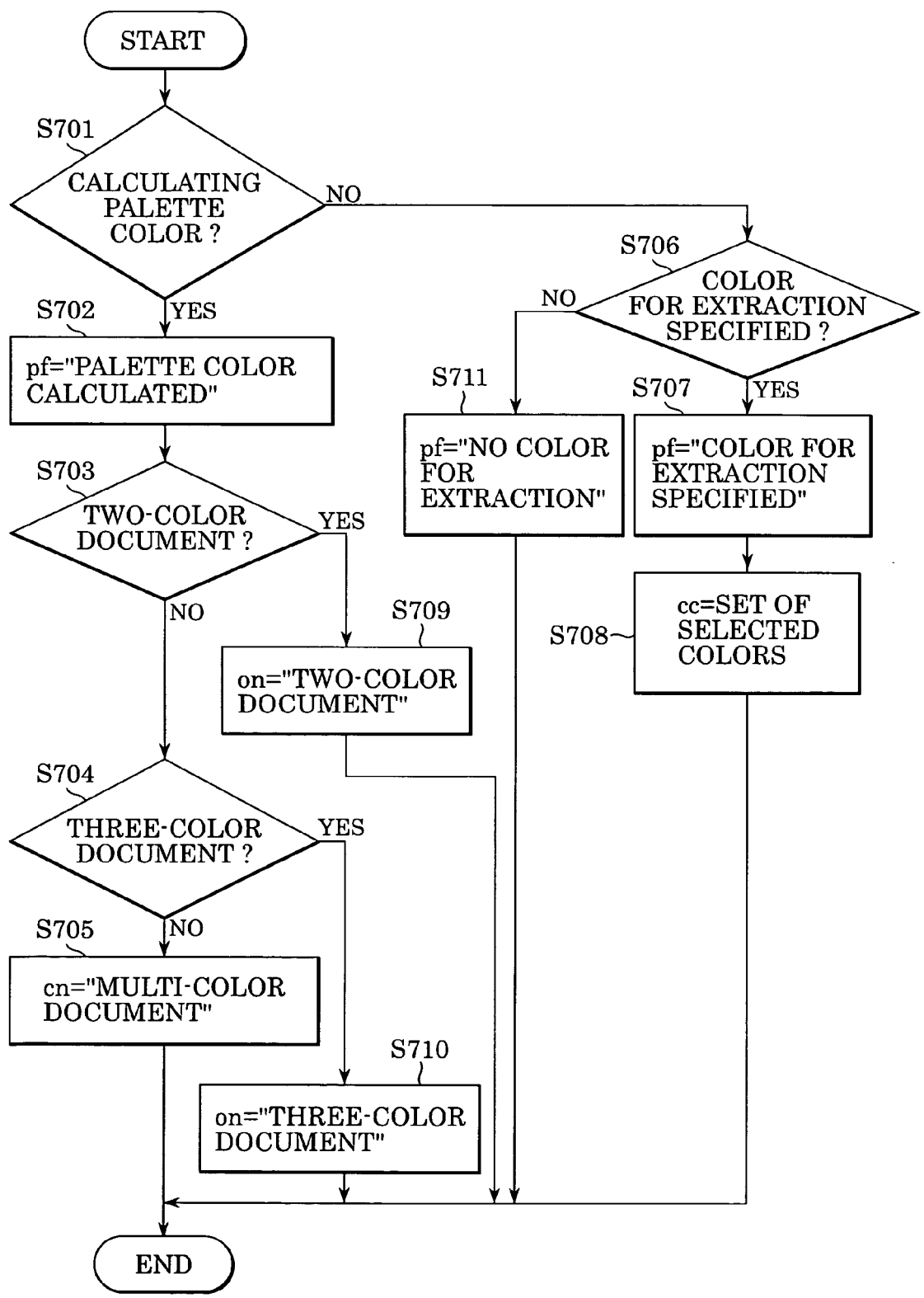
FIG. 7 is a flowchart illustrating a document type selection process in accordance with an embodiment of the present invention.

The job input step in step S301 will now be discussed with reference to FIGS. 5, 6, and 7. FIG. 5 is a flowchart illustrating the job input process.

In the screen display step S501, a job menu screen 801 of FIG. 8 is displayed on a display having a touchpanel function of the management PC 101. When the user selects a start key 825 on the job menu screen 801, the system goes to a process further discussed below.

In a function selection process in step S502, the user settings on the job menu screen 801 are analyzed, and are converted into information which is easy for the management PC 101 to process. The function to be performed is thus identified. Additional details of the function selection process will be discussed later with reference to FIG. 6. In the document type selection process of step S503, the user settings on the job menu screen 801 are analyzed, and are converted into information which is easy for the management PC 101 to process. The converted information is set to parameter (pf) representing an image processing function, a parameter (cn) representing the number of colors at the calculation of palette colors, and a parameter (cc) representing a set of colors selected when the extraction color is specified.

The setting input process of step S501 is described below with reference to FIG. 8. When the user wishes to scan an image, a SCAN check box 803 is shadowed. To select an image file stored on the system, a DOCUMENT check box 804 is selected, and the check box is shadowed. The DOCUMENT is input via an input box 805, which receives a file pathname entered by the user with a keyboard or the like. Instead of keyboard inputting, the user may call a directory and path list of a file system and may select a desired file in the list. For this operation, a DOCUMENT key 806 is selected. The input method for inputting other selections remains similar to the above method.

An image output box 807 is available on the screen to specify output processes of a file obtained as a result of vector synthesis. The user checks a PRINT box 808 to perform a recording process (printing process), checks a BOX box 809 to store the file in a box in the storage 111, or checks an EMAIL box 811 to transmit an e-mail, and enters corresponding e-mail settings in box 812.

If the user selects the BOX box 809 of FIG. 8, the box becomes shadowed, thereby receiving an input from BOX key 813-1. If the BOX key 813-1 is selected, a box list screen pops up as shown in FIG. 16. If the user selects a third BOX 1605 in the box list 1601, and returns to the screen, "03 NAGOYA" is displayed in a BOX selection box 810. In the popup screen, "NO." (1602) represents a serial number of the BOX, "BOX NAME" (1603) is the name of the BOX, and "DOC" (1603) lists the number of documents already stored in the BOX.

Figure 10:
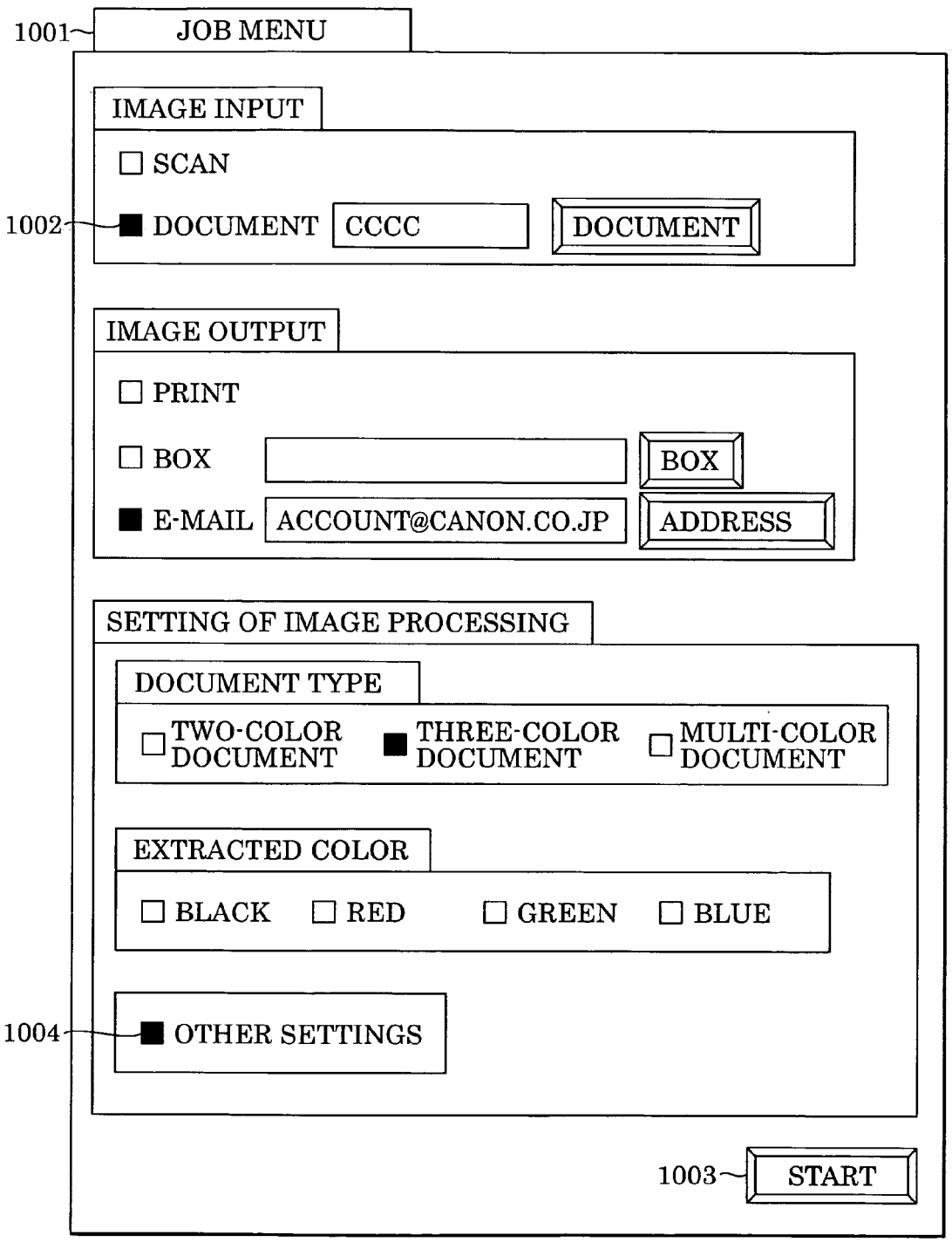
FIG. 10 illustrates a job menu screen on which the user specifies a job in accordance with an embodiment of the present invention.

Although FIGS. 8, 9, and 10 omit the job menu screen, the image file stored in the BOX may be set at the setting of the image input screen (802). In such a case, the image input setting screen (802) shows a check box (809), a BOX selection box 810, and a BOX key 813-1. The process up to the selection of the BOX remains identical to the process of the image output box 807 already discussed. The difference from the image output destination setting is described below with reference to FIG. 17. When the BOX is selected from the box list, a document list screen of FIG. 17 contained in the selected BOX pops up. A third image data document (file) (1708) is selected from a "document list (NAGOYA)" 1701. If a return key (not shown) is selected to return to the previous screen (job menu 801), a BOX selection screen 810 additionally shows "03 NAGOYA CCCC XXXX 05/20 '03 11:33 7 PAGES" in the format of a document name, a creator name, date and time, and the number pages.

The document in the BOX selected in the image input box 802, and selected in the image output box 807 is described below with reference to FIG. 18. The image data file 1708 is added as an electronic vector data file 1802 that has been subjected to the color extraction process, and the vectorization process. As shown for the vector data file 1802, a "VECT" type document is generated from the file "CCCC" with the document file type "JPEG".

The function selection process in step S502 will now be discussed with reference to FIG. 6. The image input box 802 and the image output box 807 are selected in the screen display process in step S501.

A function parameter (f) in the function selection process is set based on the conditions input in the image input 802 and the image output 807.

In step S605, it is determined whether scan in the image input and storage (BOX) in the image output (as represented by the boxes 803 and 809 in FIG. 8) are set. If the image input and the image output are set (i.e., yes), the algorithm proceeds to step S605. In step S605, scan and storage are set for the function parameter (f), and the process ends.

If the image input and the image output are not set (i.e., no), the algorithm proceeds to step S602. In step S602, it is determined whether scan in the image input 802 and print in the image output 807 is set. If yes, the algorithm proceeds to step S606. In step S606, scan and print are set for the function parameter (f), and the process ends. If the answer to the determination in step S602 is no, the algorithm proceeds to step S603. In step S603, it is determined whether document in the image input 802 and setting other than print in the image output setting 807 are set. If yes, the algorithm proceeds to step S607, in which "file conversion and storage" are set for the function parameter (f), and the process ends. If the answer to the determination in step S603 is no, the algorithm proceeds to step S604 to set "file conversion and print" for the function parameter (f), and the process ends after setting of "file conversion and print" for the function parameter (f). The description of the selection of e-mail of FIG. 8 is omitted in FIG. 6. If the e-mail is selected, the e-mail is set for the function parameter (f) in the same manner as the storage (BOX) or PRINT.

A document type selection process in step S503 is described below with reference to FIG. 7. Here, one of check boxes in a document type 815 for specifying the number of palette colors, in the extraction color specifying box 819, or in other settings 824 has been selected in the screen display process in step S501.

In step S701, the system checks which of check boxes 816-818 in the document type 815 is selected in the setting of image processing 814 of the job menu screen of FIG. 8.

If it is determined that no check boxes are selected (i.e., no), the algorithm proceeds to step S706. If the answer to the determination in step S701 is yes, the algorithm proceeds to step S702. In step S702, "palette color calculated" is set for a parameter (pf) representing the image processing function to indicate that selected information for the document type box 815 is calculated for a palette color as an input parameter.

It is then determined in step S703 whether a two-color document 816 is selected in the document type box 815. If yes, the algorithm proceeds to step S709. A "two-color document" is set for a parameter (cn) representing the number of colors used in the selection of palette colors, and the process ends. If the answer to the determination in step S703 is no, the algorithm proceeds to step S704. It is then determined in step S704 whether three-color document 817 is selected. If yes, the algorithm proceeds to step S710. In step S710, the "three-color document" is set for the parameter (cn), and the process ends. If the answer to the determination in step S704 is no, the algorithm proceeds to step S705. In step S705, a "multi-color document" meaning that the number of colors defined beforehand in the parameter (cn) is used is set, and the process ends.

It is determined in step S706 whether one or more check boxes for extraction color specifying box 819 are checked. If yes, the algorithm proceeds to step S711. In step S711, "no color extraction" is set for the parameter (pf) meaning that all image objects of the image data are vectorized and that no color extraction is performed. If the answer to the determination in step S706 is yes, the algorithm proceeds to step S707. An "extraction color specified" is set for the parameter (pf) meaning that the vectorization process is performed after the color extraction is performed with at least one specified color without the palette color calculation process.

In step S708, a set of colors set in the extraction color 819 is set for the parameter (cc).

Figure 22A:
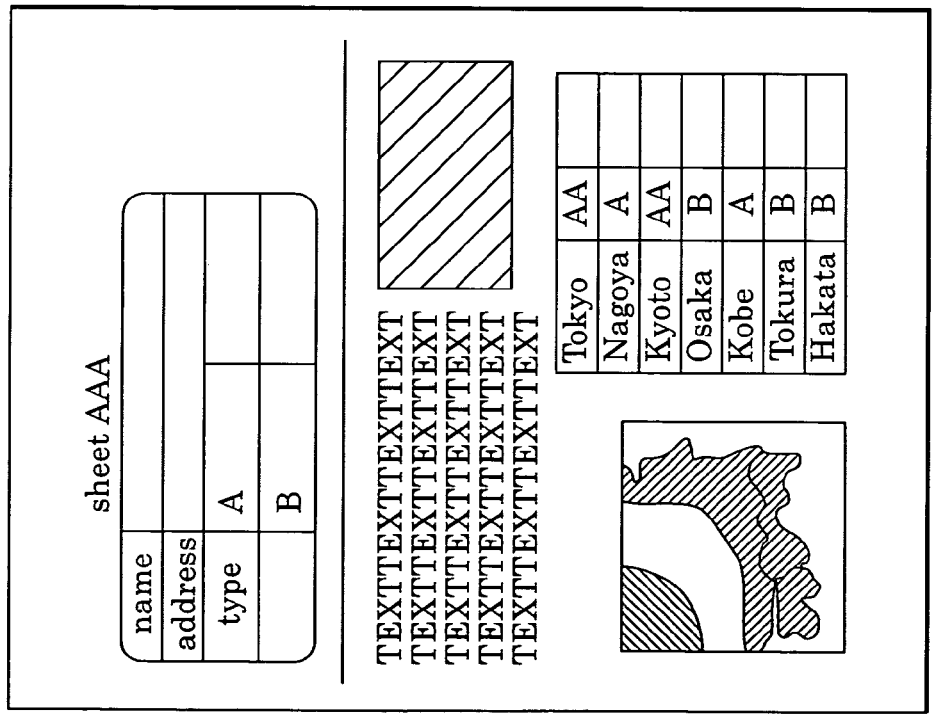
FIGS. 22A and 22B illustrate a block selection process in accordance with an embodiment of the present invention.

In a block selection process, a bit-map image (see FIG. 22A) of one page read in step S303 of FIG. 3 is recognized as blocks of each image object. Each block is identified as a character, figure, photograph, line, or table. The blocks are thus classified according to attribute (see FIG. 22B).

The block selection process is described below. An input image is binarized into black and white. An outline is tracked to extract a group of pixels surrounded by a black pixel outline. In the case of a group of black pixels having a large area, outline tracking is performed on the white pixels present within the outline to extract a group of white pixels. Furthermore, a group of black pixels is recursively extracted from within the group of white pixels having an area larger than a constant value.

The groups of black pixels obtained in this way are classified according to size and shape into different areas having different attributes. For example, a pixel area having an aspect ratio of 1 and a size falling within a constant range is classified as a character. Adjacent characters, which are arranged in a line and grouped, are a character block. An elongated pixel group is classified as a line block. An area having a size larger than a constant value and having groups of white pixels in a rectangular shape regularly aligned therewithin is classified as a table block. A group of pixels distributed in a variant shape is classified as a photograph block. A group of pixels in any shape is classified as a figure block.

Figure 22B:
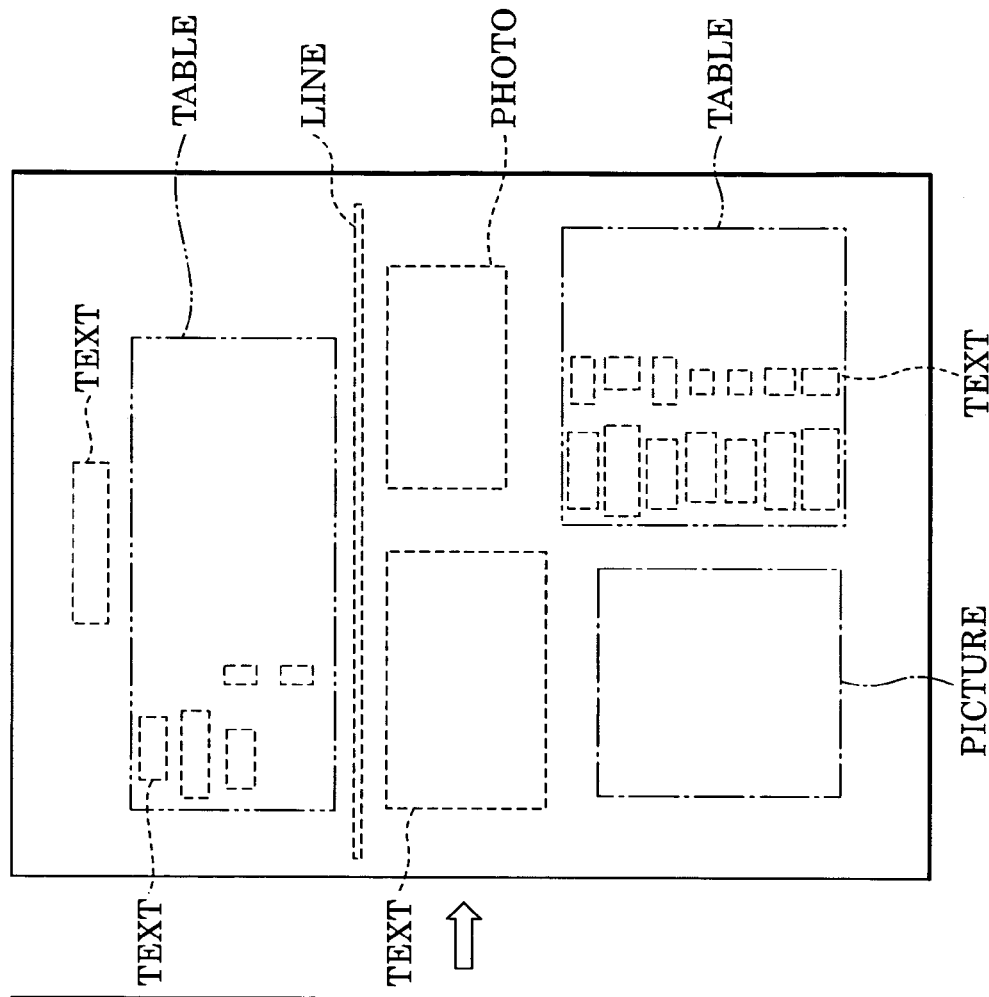

FIG. 22B illustrates block information relating to blocks obtained in the block selection process. The block information is used in a search operation and in the vectorization process to be discussed later.

The palette color calculation process in step S307 of FIG. 3 is described below. A median cut technique is available for calculating a palette color as a subtractive process. The median cut technique is used to select a representative color from a full-color image. An RGB space of an image is segmented into a plurality of partial spaces. The average of a color contained in each space is a representative color (palette color).

Figure 20:
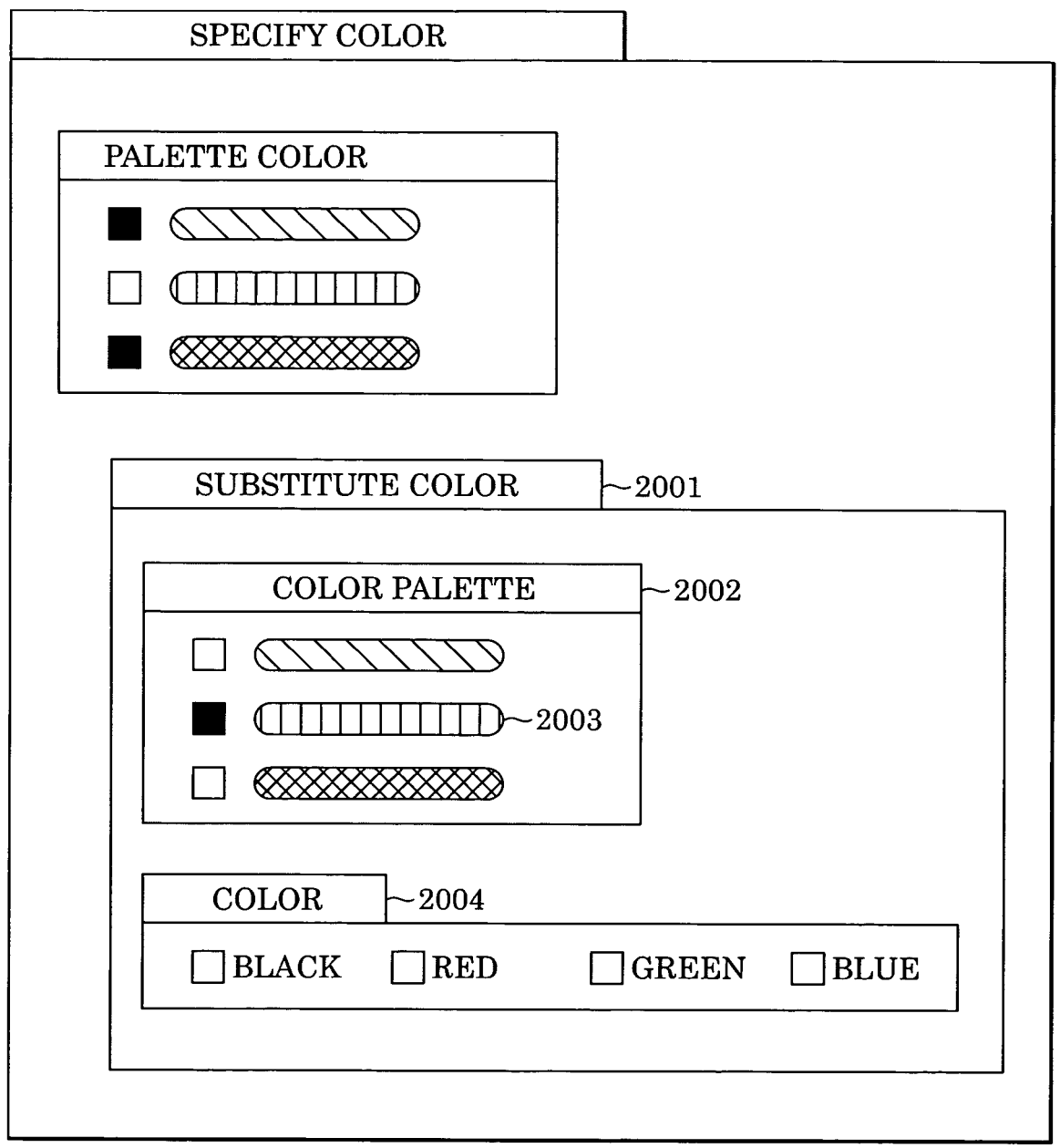
FIG. 20 illustrates a screen on which a palette color to be vector data synthesized and a substitute color are selected in accordance with an embodiment of the present invention.

In the segmentation of the color space, the color space is segmented at the median value of the widest color width along the axes of red, green, and blue. The RGB mean value of the segmented partial space is stored as a palette color in the storage 111, and is referenced as the color attribute in the color-based object management table. The palette color thus calculated is used as colors (1903, 1904, 2003, etc) in the palette colors (1902, 1906, 2002, etc.) as shown in FIGS. 19 and 20.

The random dither method is also available in addition to the median cut technique. For example, the random dither method is specifically disclosed in Japanese Patent Laid-Open No. 2002-170123, Japanese Patent Publication No. 4-48275, and Japanese Patent Publication No. 4-6769. The present invention employs a median cut technique, but the detailed discussion of the median cut technique is omitted here in this specification. Another technique may be employed to determine palette color.

The color extraction process in step S308 of FIG. 3 is performed by known methods. The color extraction process is specifically disclosed in Japanese Patent Laid-Open No. 8-237681, Japanese Patent laid-Open No. 10-151591 (corresponding U.S. Pat. No. 6,088,469), Japanese Patent Laid-Open No. 2002-131133, and Japanese Patent Laid-Open No. 2002-163650. The present invention employs known extraction processes and thus detailed discussion thereof is omitted in this specification.

The vectorization process in step S308 of FIG. 3 is now described below. A character recognition process is applied to each character block of each character.

In the character recognition process, a pattern matching technique is applied to an image extracted according to the unit of character to acquire a corresponding character code. A lexical feature vector defined beforehand for each character type is compared with an observed feature vector of a numerical string having several tens of dimensions into which a feature from the character image is converted, and a character type closest in distance to the character is adopted as a recognition result. A variety of known methods are available for the extraction of the feature vector. For example, each character may be segmented into a mesh, and a character line within the mesh is counted as a line element.

The character recognition is now performed on the character block extracted in the block selection in step S304. The system determines whether the alignment of the characters is vertical or horizontal. A row of the characters is extracted in the corresponding direction, and each character is then extracted to result in a character image. The determination as to whether the character block contains the horizontally aligned characters or the vertically aligned characters is performed by detecting projection of the pixel values in the horizontal direction and the vertical direction. If the variance of the pixel values in the horizontal projection is large, the character block is determined to be horizontally aligned. If the variance of the pixel values in the vertical projection is large, the character block is determined to be vertically aligned. The character block is decomposed into a character string and characters by slicing a row using the projection in the horizontal direction if the character block is horizontally aligned. Further, each character is sliced in the projection perpendicular to the sliced row. The horizontal projection and the vertical projection are reversed for the vertically aligned character block. The size of the character is also detected.

A plurality of lexical feature vectors of character types used for the character recognition is prepared for character shape type, namely, font types. During pattern matching, a font type is also output together with a character code to recognize the font of the character.

Information for the character block is converted into vector data using both the character code and the font information obtained through the character recognition process and the font recognition process. The information is also converted using the outline font data prepared beforehand. If the original document is a color image, the color of the character is extracted from the color image, and is recorded together with the vector data.

In this way, the bit-map image of the character block is converted to the vector data substantially similar to the original document in shape, size, and color.

Figure 11:
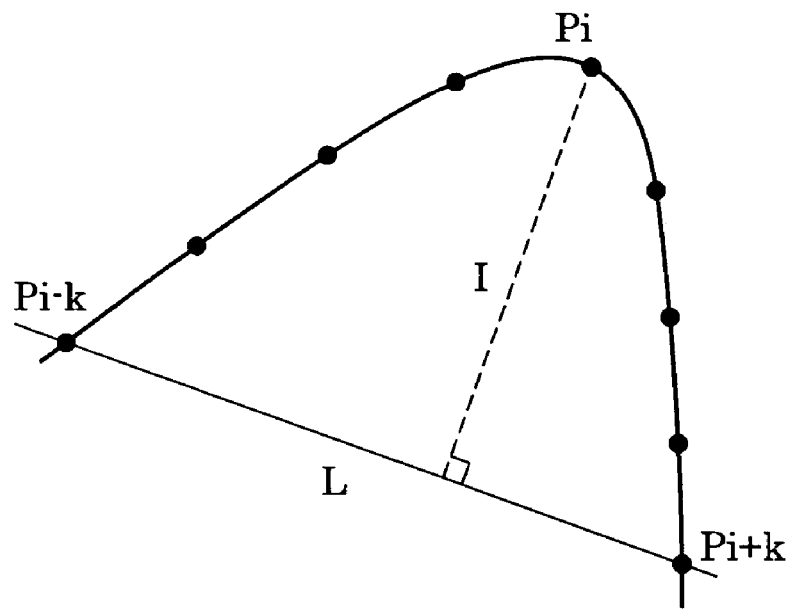
FIG. 11 illustrates the concept of the process for converting, to vector data, an area that is categorized as a figure, a line, or a table, etc. in a block selection process in accordance with an embodiment of the present invention.

In the block selection step S304, an area determined to be a figure block, a line block, or a table block is considered. The outline of meaningful color pixel groups extracted from within the area is converted into vector data. More specifically, a dot train of pixels forming an outline is segmented at a point considered as a corner, and each segment is approximated by a line segment or a curve. The corner is a point having a maximum curvature. If a chord is drawn between point Pi−k and point Pi+k, spaced away by k points on the left and right hand sides from a point Pi as shown in FIG. 11, a point having a maximum curvature is determined as a point having the largest distance between the chord and point Pi. Let R represent the quotient of the length of the chord between point Pi−k and point Pi+k divided by the length of an arc between point Pi−k and point Pi+k, and a point having the value of R below a threshold is considered to be a corner. Each segment divided by the corner is vectorized using a least squares method for the line segment, and cubic spline function for the curve.

If a block includes an internal outline, a dot train of white pixel outline extracted in the block selection process is approximated using a partial line segment or a curve.

With the segment line linear approximation of the outline, an outline having any figure shape is vectorized. If the original document is a color image, the color of the figure is extracted, and is stored together with the vector data.

Figure 12:
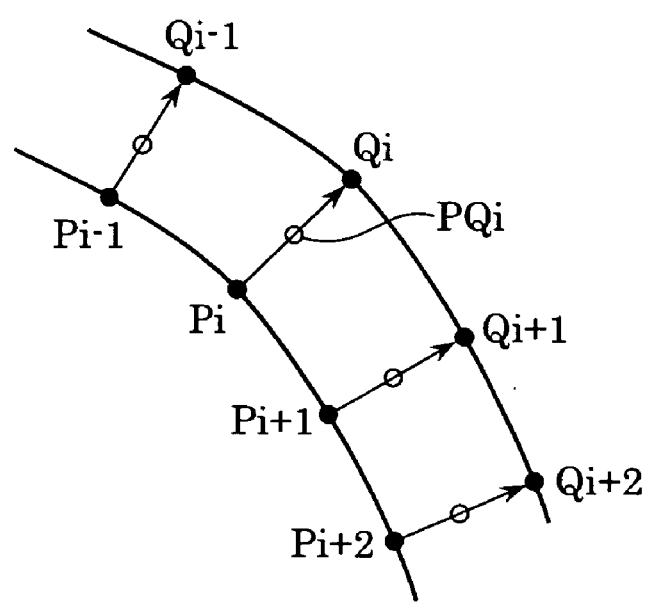
FIG. 12 illustrates the concept of the process for converting, to vector data, an area that is categorized as a figure, a line, or a table, etc. in a block selection process in accordance with an embodiment of the present invention.

If an external outline is close to an internal outline or another outline in an area as shown in FIG. 12, the two outlines are unified as a line having a width. More specifically, a line segment having the shortest length is drawn from a point Pi on an outline to a point Qi on the other outline. If the mean of the length PQi is equal to or shorter than a predetermined constant length, the intermediate points of the line segments PQi are treated as a dot train within the segment of interest. The dot train is approximated by a line segment or a curve, and the magnitude thereof is the mean value of the PQi. The table constructed of lines and a set of lines is efficiently vectorized as a set of lines having the magnitude discussed above.

The vectorization using the character recognition process on the character block has been discussed. The character having the closest distance to a lexicon is used as the recognition result. If the distance is above a predetermined value, the result fails to match the original character and is erroneously recognized as a character similar in shape to the original character in many cases. In accordance with an embodiment of the present invention, such a character is treated as a lineart, and is then outlined. Thus, an advantage of the present invention is that such a character, which is subject to erroneous character recognition by conventional systems, is free from erroneous vectorization. The vectorization is performed by visibly outlining the bit-map image.

A block, determined to be a photograph, cannot be vectorized and thus remains a bit-map image.

Figure 15:
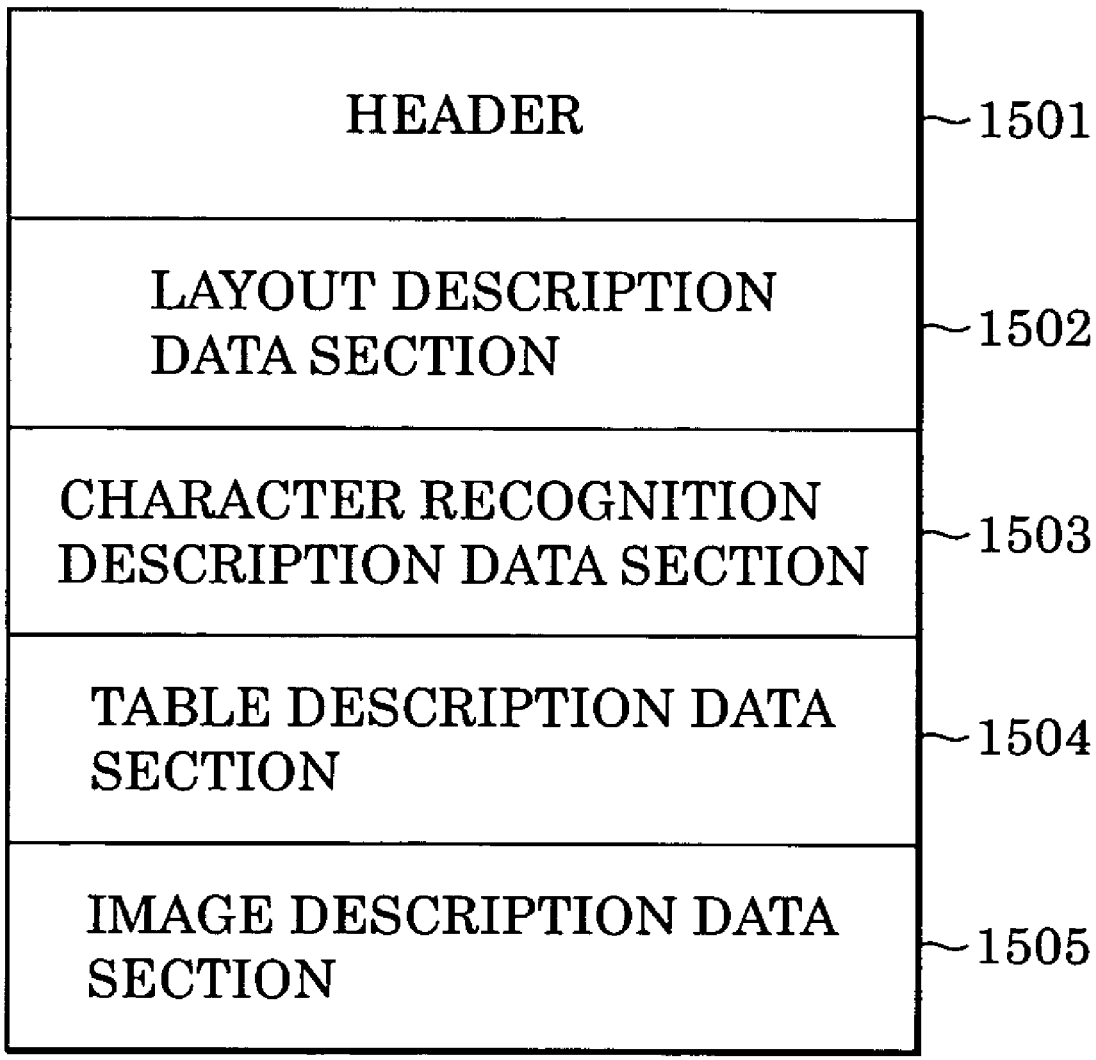
FIG. 15 illustrates the data structure of DAOF in accordance with an embodiment of the present invention.

A file in an intermediate data format, shown in FIG. 15, is provided as a result of the block selection process in step S304 and the vectorization process in step S308 performed on the bit-map image. In accordance with this embodiment of the present invention, this data format is referred to as a document analysis output format (DAOF).

FIG. 15 illustrates the data structure of the DAOF. As shown, a header 1501 holds information related to document image data to be processed. A layout description data section 1502 holds attribute information of each block of the document image data recognized on a per attribute basis, and rectangular address information thereof. The attribute information includes text, title, caption, lineart, picture, frame, table, etc. A character recognition description data section 1503 holds character recognition result obtained as a result of character recognition of the text block. A table description data section 1504 holds the detail of the structure of a table block. An image description data section 1505 holds sliced bit-map images of picture and lineart.

A figure recognition process for grouping vectorized line segment according to figure object is now described below.

Figure 13:
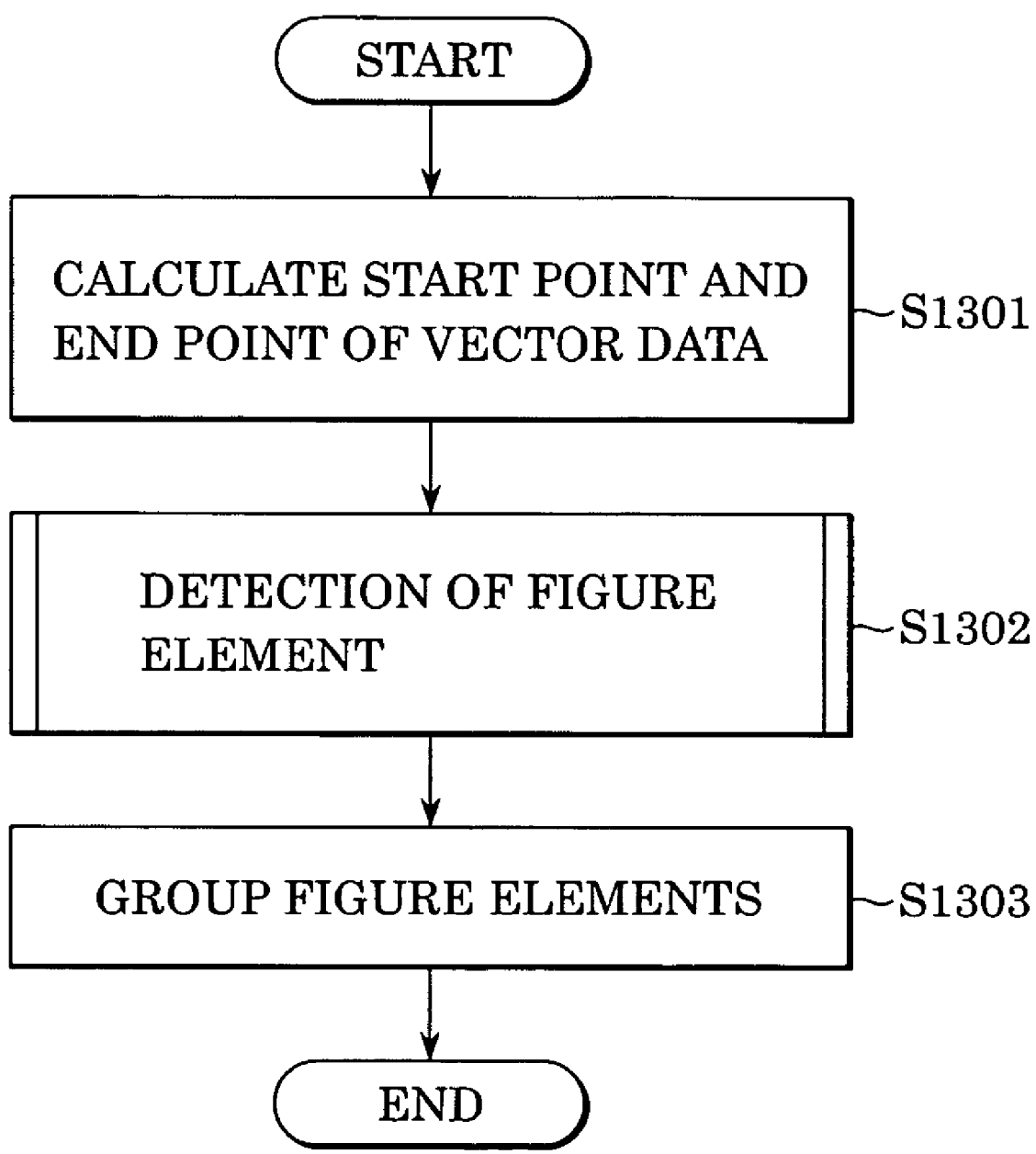
FIG. 13 is a flowchart illustrating the process for grouping the vector data into graphic objects in accordance with an embodiment of the present invention.

FIG. 13 is a flowchart illustrating a process for grouping vector data according to figure object. The start and end points of each vector data are calculated in step S1301 and then used to detect a figure element in step S1302. The detection of the figure element means the detection of a closed figure constructed of line segments. The detection of the figure element is based on the principle that each vector constructing the closed figure has vectors connected to both ends thereof. Another figure element or line segment present within the figure element is grouped as a single figure object in step S1303. If neither figure element nor line segment is present within the figure element, the figure element is set as a figure object.

Figure 14:
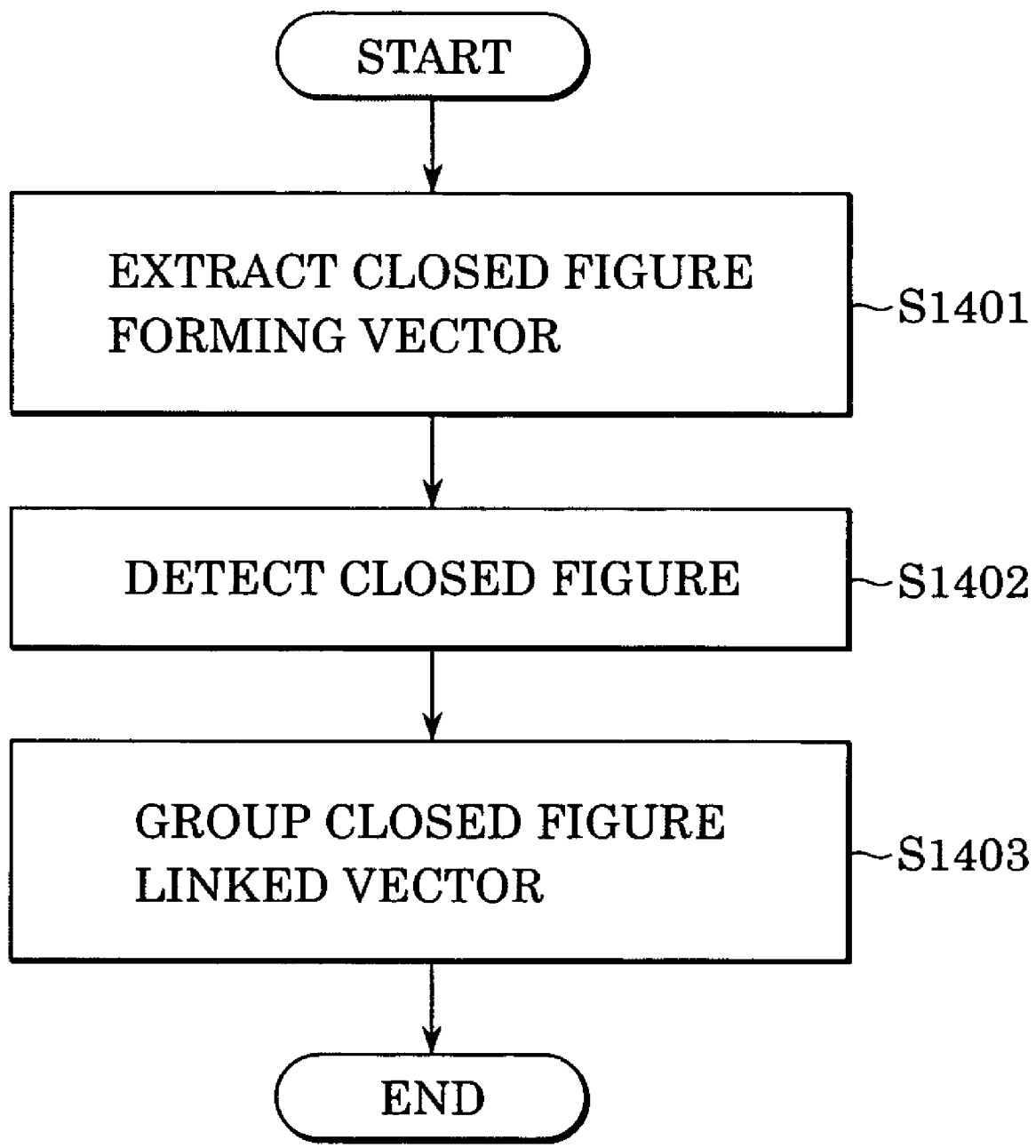
FIG. 14 is a flowchart of the process for detecting graphic elements in accordance with an embodiment of the present invention.

FIG. 14 is a flowchart of detecting a figure element. A vectors with no vectors connected at both ends is eliminated from the vector data, and a vector forming a closed figure is extracted in step S1401. The system tracks the vectors forming the closed figure successively in a clockwise direction, using the start point of a vector of interest as a track start point. The vector tracking is performed to the track start point. All vectors tracked along are grouped as a closed figure in step S1402. Vectors forming another closed figure within the closed figure are all grouped. The same process is repeated on ungrouped vectors, using a start point of one of the ungrouped vectors as a track start point. Any of vectors removed in step S1401 but joining a vector grouped as a closed figure in step S1402 is detected and grouped as one figure element in step S1403.

The figure block is thus handled as a reusable individual figure object.

In the vector data synthesis process in step S405 of FIG. 4, a synthesis flag of an object that is extracted based on the palette color and vectorized is set to "on" in a color-based object management table (see FIG. 24) for managing the vectorized objects according to color. This process is described below with reference to FIG. 28.

A management record is searched and checked in the color-based object management table (see FIG. 24) in step S2801. Whether the management record is a final management record is determined in step S2802. If the answer to the determination in step S2802 is yes, the process ends.

If the answer to the determination in step S2802 is no, the algorithm proceeds to step S2803, in which the system determines whether a "calculated palette color" is set for the color type attribute of the management record. If the answer is yes, the algorithm proceeds to step S2806. If not, the algorithm proceeds to step S2804. The system determines in step S2804 whether the color attribute is set to a specified color. The specified color includes the extraction color 819 of FIG. 8, or a set of specified colors selected in the box 908 of FIG. 9 (any color of the parameter (CC) set in step S708). If the answer to the determination in step S2804 is no, the algorithm loops to step S2801 to check the next management record. If the answer is yes, the algorithm proceeds to step S2805. The synthesis flag of the management under check is set to "on", and then the algorithm loops to step S2801 to check the next management record.

The system determines in step S2806 whether the palette colors (1903 and 1904) selected by the user from the calculated palette colors (1902) of FIG. 19 are contained in the color attribute of the management record under check. If no, the algorithm loops to step S2801 to check the next management record. If the answer to the determination in step S2806 is yes, the algorithm proceeds to step S2807. In step S2807, the synthesis flag in the management record under check is set to "on", and the algorithm loops to step S2801 to check the next management record.

Figure 29:
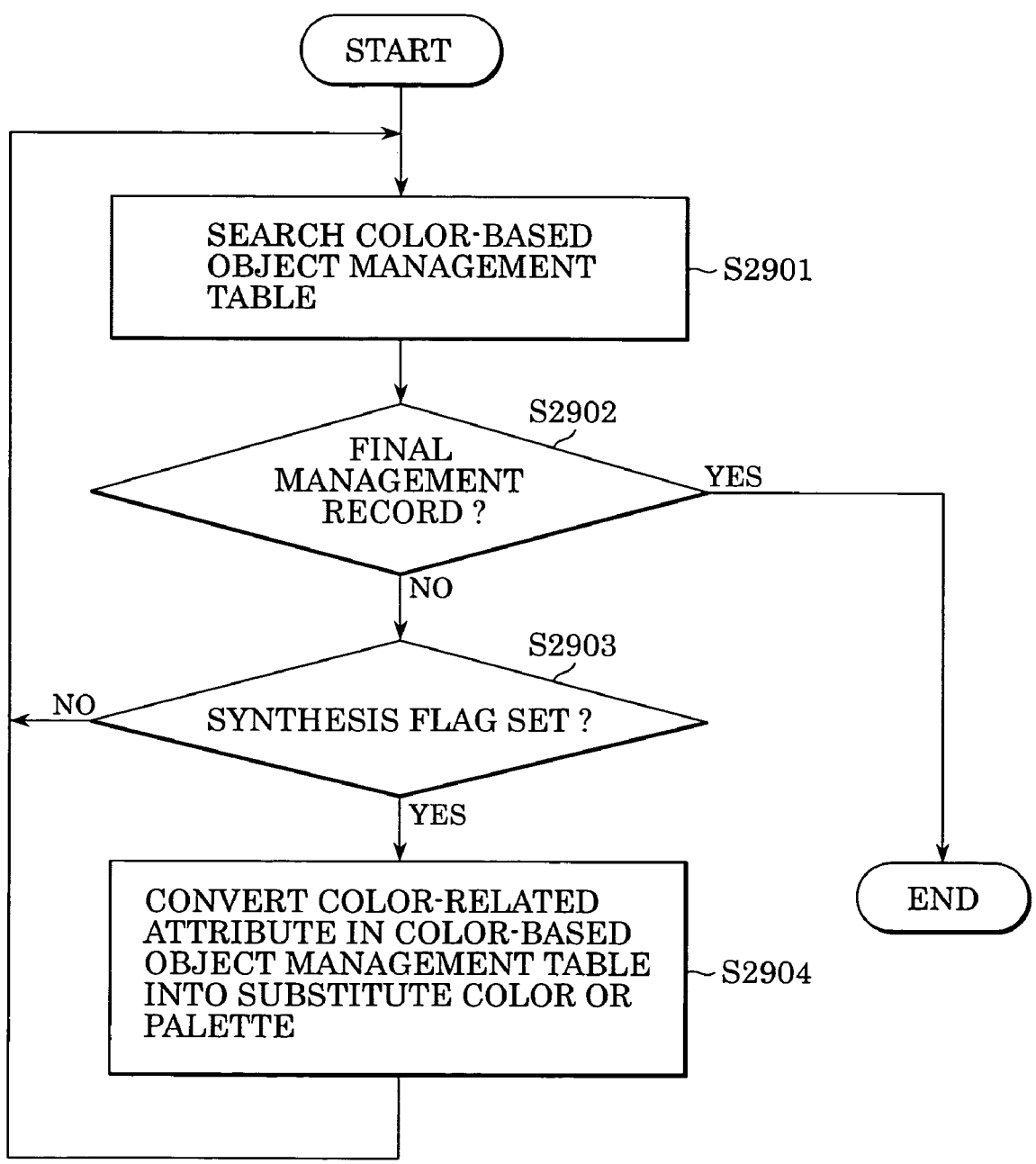
FIG. 29 is a flowchart illustrating a vector data color substitution process in accordance with an embodiment of the present invention.

A color substitution process in step S407 of FIG. 4 will now be discussed with reference to the flowchart of the color substitution process (vector data conversion) of FIG. 29.

Each management record of the color-based object management table (FIG. 24) is searched and checked in step S2901. The system determines in step S2902 whether the management record is a final management record. If the answer to the determination in step S2902 is yes, the process ends.

If the answer to the determination in step S2902 is no, the algorithm proceeds to step S2903. The system determines whether the synthesis flag of the management record under check is set to "on". If no, the algorithm loops to step S2901 to check the next management record.

If the answer to the determination in step S2903 is yes, the algorithm proceeds to step S2904. The substitute colors (the selected color 1905 of FIG. 9, the selected color 2001 of FIG. 20, and the selected color 2101 of FIG. 21) are substituted for the color type attribute and the color attribute in the management record under check. As shown in FIG. 20, for example, the "palette color" is set for the color type attribute, and a second color palette 2003 is set for the color attribute. The algorithm loops to step S2901 to check the next management record.

Figure 30:
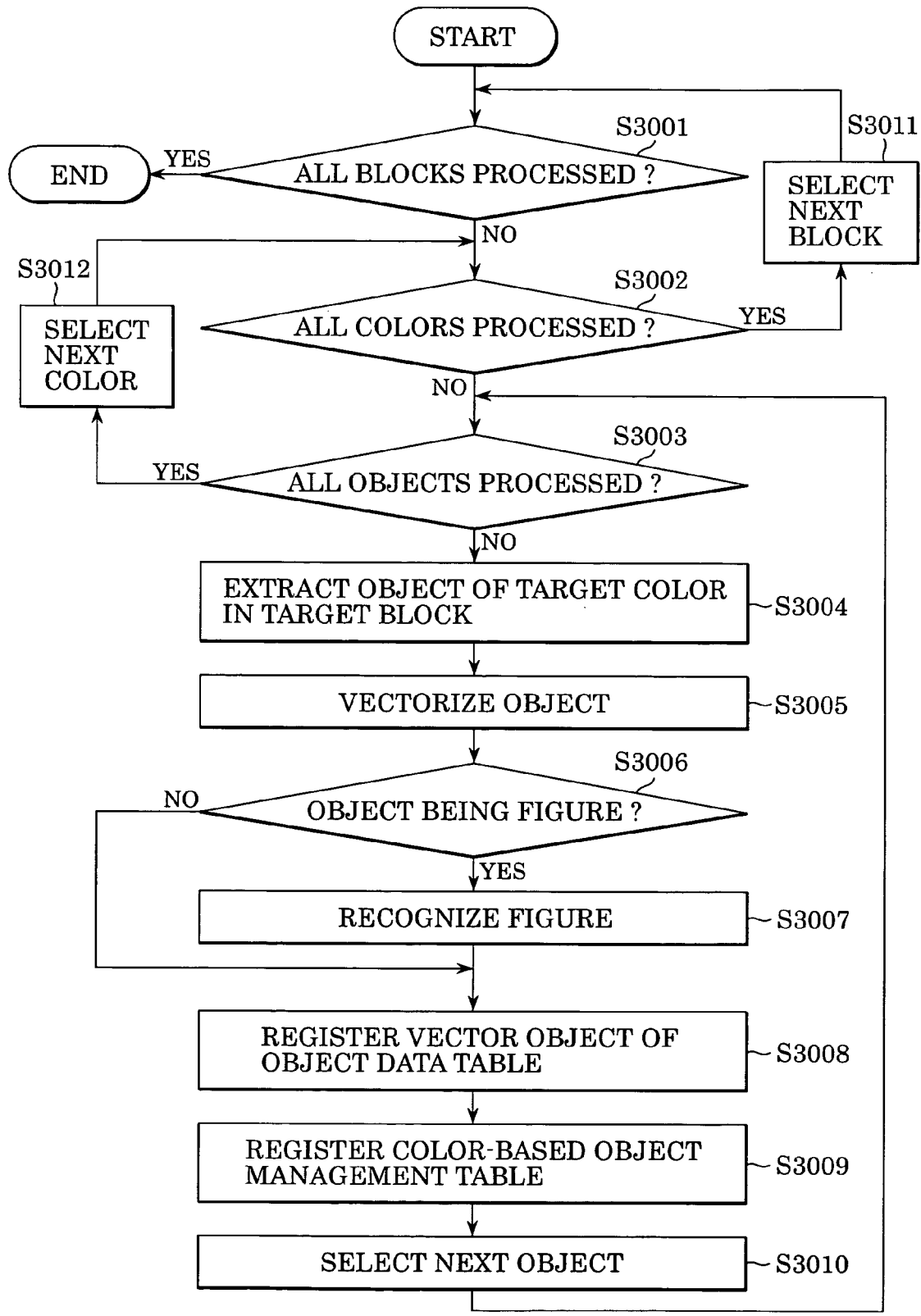
FIG. 30 is a flowchart illustrating the process of color extraction, vectorization, and graphic recognition in accordance with an embodiment of the present invention.

The color extraction, the vectorization, and the figure recognition process in step S308 of FIG. 3 are described below with reference to a flowchart of FIG. 30. The system determines in step S3001 whether search and processing of all block information are complete. If yes, the process ends. If no, the algorithm proceeds to step S3002. Whether all palette colors are processed is determined in step S3002. If all the palette colors have been processed, the algorithm proceeds to step S3011 to process the next block, and then the algorithm loops to step S3001.

If not, the algorithm proceeds to step S3003. In step S3003, the system determines whether all objects to be color extracted in the currently processed block are processed. If yes, the algorithm proceeds to step S3012. Then, the algorithm loops to step S3002 to process the next extraction color.

If the answer to the determination in step S3003 is no, the algorithm proceeds to step S3004. The system extracts an object of a target color in a target block, and performs the vectorization process on the target object in step S3005.

The system determines in step S3006 whether the vectorized object is a figure. If yes, the figure recognition process is performed in step S3007 and then the algorithm proceeds to step S3008. If it is determined that the vectorized object is not a figure, step S3007 is skipped.

In step S3008, the system registers the management record to the object data table of FIG. 25 stored in the storage 111 and sets, to the management record, the attributes (such as a record number, an object type, content, vector object (like SVG vector data of FIG. 26)).

In step S3009, the system adds the management record to the color-based object table of FIG. 24 stored in the storage 111 and sets, to the management record, the attributes (such as a record number, a block number, a color type, color, a pointer to the record in the object data table).

In step S3010, the next image data object is set to be processed, and then the algorithm loops to step S3003.

In step S408, a variety of processes (editing, storage, transmission, recording, etc.) are performed. Discussed below is a process for converting to raster image data, which is performed when an object of a selected color is printed.

Figures 26, 27:
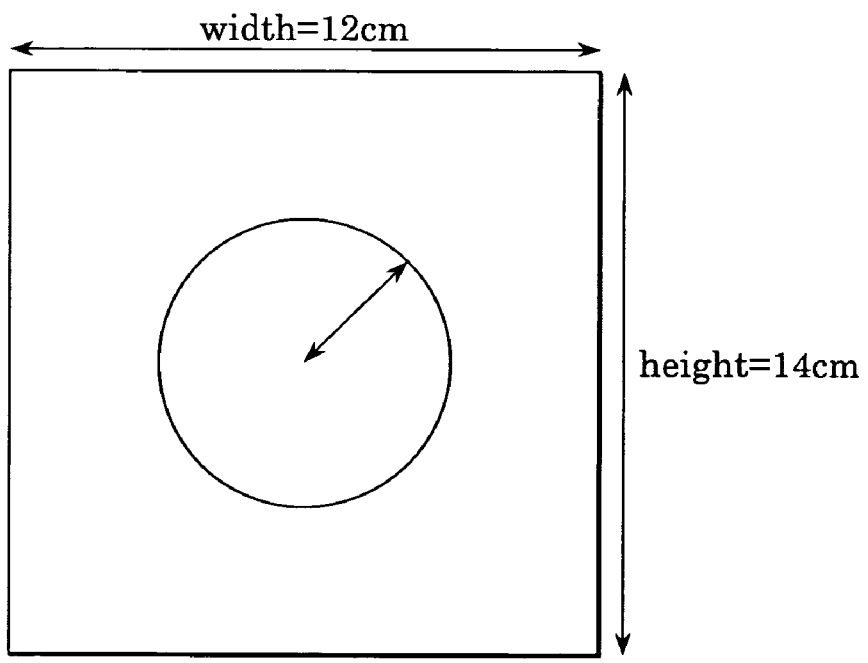
FIG. 26 illustrates an example of SVG vector data in accordance with an embodiment of the present invention.
FIG. 27 illustrates an SVG figure in accordance with an embodiment of the present invention.

The process of converting the SVG vector data of FIG. 26 and the vector data of the SVG figure of FIG. 27 into the raster image data is briefly discussed.

FIG. 26 illustrates SVG vector data that is described in scalable vector graphics (SVG) format, standardized by the W3C. The processor of management PC 101 and/or the data processor 115 of the MFP 100 of FIG. 2 includes a parser for parsing the SVG vector data. The parser interprets an object (for example, data between "<svg> and </svg>), performs a rendering process, and stores the data as the raster image data in the storage 111. For example, the object data here is a circle. In a rectangular area having a width of 12 cm and height of 14 cm, a circle having a radius of 4 cm is rendered in blue color with the center thereof positioned at 6 cm horizontally rightward away from and 7 cm vertically downward away from the top left corner of the rectangular area without being filled. In the raster image data conversion process of the vector data, a render function (for rendering a circle, for example) is used to process the result of parsing. For example, if the circle rendering function is operated on the SVG object data, an image shown in FIG. 27 is stored in the data processor 115, the RAM of the management PC 101, and the storage 111.

The raster image data of FIG. 27 stored in the storage 111 is printed out on paper by the recorder 112.

In accordance with the embodiment of the present invention, each object is vectorized on a per color basis according to a palette color calculated from the image data or an extraction color selected by the user.

The data is vectorized on a per block basis, on a per color basis, or on a per object basis. An object is easily output with another color substituted for a predetermined color.

When a command to calculate the palette color is issued, vector data of all calculated palette colors remains in storage means. Output processes (including printing, displaying, raster video displaying) may be performed on the vector data stored in the storage means with the palette color reselected. This arrangement eliminates the need for re-vectorizing the bit-map data. The amount of vector data per object stored in the storage means is substantially smaller than the bit-map image data, and is thus easy to process. High-speed processing is achieved in comparison with the case in which the object is re-extracted from the bit-map data image, and processed.

As a result, the ease of use of the image processing system for converting the bit-map image to the vector data is achieved.

In the foregoing embodiment, the character code, the character size, the character style, and the font are recognized from the OCR process and are vectorized using an outline font. As with the figure and data, all characters within the character block may be vectorized by extracting the outline.

In the foregoing embodiment, the vector data is described in SVG. A format other then SVG may be employed.

A storage medium storing program codes of the software program performing the functions of the embodiment of the present invention is installed in a system, and a computer (CPU or MPU) of the system or the system reads and executes the program codes stored in the storage medium. Such embodiments achieve the object of the present invention.

The program codes read from the storage medium perform the functions of the foregoing embodiment of the present invention, and storage medium storing the program codes falls within the scope of the present invention.

Available as storage media for supplying the program codes are a floppy® disk, a hard disk, an optical disk, a magneto-optical disk, a CD-ROM, a CD-R, a CD-RW, a magnetic tape, a nonvolatile memory card, and ROM and the like.

By executing the program codes ready by the computer, the functions of the foregoing embodiment are performed. Furthermore, the operating system (OS) running on the computer performs partly or entirely a process in response to the instruction of the program code, and with the process performed, the functions of the above-referenced embodiment are performed. Such programs codes fall within the scope of the present invention.

The program codes from the storage medium are read into a memory incorporated in a feature expansion board in the computer of in a feature expansion unit connected to the computer. The CPU mounted on the feature expansion board or the feature expansion unit performs partly or entirely the actual process in response to the instruction from the program codes. The functions of the above embodiments are executed through the process. Such program codes fall within the scope of the present invention.

The present invention is applicable to a system including a plurality of systems (such as a host computer, interface devices, a reader, a printer), or a single system (a copying system, a facsimile device, a scanner).

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing system for converting a bit-map image of a plurality of colors into vector data, the image processing system comprising:
   selecting means for selecting a color desired by a user;
   extracting means for extracting a partial image, corresponding to the selected color, from the bit-map image;
   vectorization means for converting the extracted partial image into vector data per color object to store the vector data onto memory means; and
   control means for controlling the vector data per color object, stored in the vectorization means, to vector data desired by the user.

2. An image processing system according to claim 1, further comprising color substituting means for substituting the vector data with a color desired by the user.

3. An image processing system according to claim 1, further comprising area segmenting means for segmenting the bit-map image into a plurality of areas on an area per attribute basis,
   wherein the vectorization means performs the vectorization process based on the attribute of each area.

4. An image processing system according to claim 1, further comprising output means for outputting, in an SVG (scalable vector graphics) format, the vector data.

5. An image processing system for converting a bit-map image of a plurality of colors into vector data, the image processing system comprising:
   palette color calculating means for calculating a palette color based on the bit-map image;
   extracting means for extracting a partial image, corresponding to the calculated palette color, from the bit-map image;
   vectorization means for converting the extracted partial image into vector data per color object to store the vector data onto memory means;
   selecting means for selecting some color samples, desired by a user in response to an instruction from the user, from the calculated palette colors; and
   control means for controlling the vector data per object, selected from the vector data stored in the vectorization means based on the color selected by the selecting means, to vector data desired by the user.

6. An image processing system according to claim 5, further comprising color substituting means for substituting color desired by the user for the color of the vector data.

7. An image processing system according to claim 5, further comprising area segmenting means for segmenting the bit-map image into a plurality of areas on an area per attribute basis,
   wherein the vectorization means performs the vectorization process based on the attribute of each area.

8. An image processing system according to claim 5, further comprising output means for outputting, in an SVG format, the vector data.

9. An image processing system for converting a bit-map image of a plurality of colors into vector data, the image processing system comprising:
   determining means for determining whether a selection command for selecting color desired by a user or a calculation command for calculating a palette color is issued in response to an instruction from the user;
   extracting means which extracts a partial image, corresponding to the selected color desired by the user, from the bit-map image if the determining means determines that the selection command for selecting the color desired by the user has been issued, or calculates the palette color based on the bit-map image and extracts a partial image, corresponding to the calculated palette color, from the bit-map image if the determining means determines that the calculation command for calculating the palette color has been issued;
   vectorization means for converting the partial image extracted by the extracting means into vector data per color object to store the vector data onto memory means;
   selecting means for selecting, from the calculated palette colors, the color desired by the user in response to an instruction from the user if the determining means determines that the calculation command for calculating the palette color has been issued; and
   control means which controls the vector data per color object, converted by the vectorization means, to vector data desired by the user if the determining means determines that the selection command for selecting the color desired by the user has been issued, or controls, to vector data desired by the user, vector data per object selected from the vector data stored by the vectorization means based on the color selected by the selecting means if the determining means determines that the calculation command for calculating the palette color has been issued.

10. An image processing system according to claim 9, further comprising color substituting means for substituting a color desired by the user for the color of the vector data.

11. An image processing system according to claim 9, further comprising area segmenting means for segmenting the bit-map image into a plurality of areas on an area per attribute basis,
   wherein the vectorization means performs the vectorization process based on the attribute of each area.

12. An image processing system according to claim 9, further comprising output means for outputting, in an SVG format, the vector data.

13. An image processing method for converting a bit-map image of a plurality of colors into vector data, the image processing method comprising the steps of:
   selecting a color desired by a user;
   extracting a partial image, corresponding to the selected color, from the bit-map image;
   converting the extracted partial image into vector data per color object for vectorization to store the vector data onto memory means; and
   controlling the converted vector data per color object to vector data desired by the user.

14. An image processing method for converting a bit-map image of a plurality of colors into vector data, the image processing method comprising the steps of:
   calculating a palette color based on the bit-map image;
   extracting a partial image, corresponding to the calculated palette color, from the bit-map image;
   converting the extracted partial image into vector data per color object for vectorization to store the vector data onto memory means;
   selecting a color, desired by a user in response to an instruction from the user, from the calculated palette colors; and
   controlling the vector data per object, selected from the vector data stored in the converting step based on the color selected in the selecting step, to vector data desired by the user.

15. An image processing method for converting a bit-map image of a plurality of colors into vector data, the image processing method comprising the steps of:

determining whether a selection command for selecting a color desired by a user or a calculation command for calculating a palette color is issued in response to an instruction from the user;

extracting a partial image, corresponding to the selected color desired by the user, from the bit-map image if it is determined in the determining step that the selection command for selecting the color desired by the user has been issued, or calculating the palette color based on the bit-map image and extracting a partial image, corresponding to the calculated palette color, from the bit-map image if it is determined in the determining step that the calculation command for calculating the palette color has been issued;

converting the partial image extracted in the extracting step into vector data per color object for vectorization to store the vector data onto memory means;

selecting, from the calculated palette colors, the color desired by the user in response to an instruction from the user if it is determined in the determining step that the calculation command for calculating the palette color has been issued; and controlling the vector data per color object, converted in the converting step, to vector data desired by the user if it is determined in the determining step that the selection command for selecting the color desired by the user has been issued, or controlling, to vector data desired by the user, vector data per object selected from the vector data stored in the converting step based on the color selected in the selecting step if it is determined in the determining step that the calculation command for calculating the palette color has been issued.

16. A computer-readable medium encoded with a computer program for causing a computer to convert a bit-map image of a plurality of colors into vector data, the computer program comprising program codes for performing the steps of:

selecting a color desired by a user in response to an instruction from the user;

extracting a partial image, corresponding to the selected color, from the bit-map image;

converting the extracted partial image into vector data per color object for vectorization to store the vector data onto memory means; and controlling the converted vector data per color object to vector data desired by the user.

17. A computer-readable medium encoded with a computer program for causing a computer to convert a bit-map image of a plurality of colors into vector data, the computer program comprising program codes for performing the steps of:

calculating a palette color based on the bit-map image;

extracting a partial image, corresponding to the calculated palette color, from the bit-map image;

converting the extracted partial image into vector data per color object for vectorization to store the vector data onto memory means;

selecting a color, desired by a user in response to an instruction from the user, from the calculated palette colors; and controlling the vector data per object, selected from the vector data stored in the converting step based on the color selected in the selecting step, to vector data desired by the user.

18. A computer-readable medium encoded with a computer program for causing a computer to convert a bit-map image of a plurality of colors into vector data, the computer program comprising:

program code for determining whether a selection command for selecting a color desired by a user or a calculation command for calculating a palette color is issued in response to an instruction from the user;

program code for extracting a partial image, corresponding to the selected color desired by the user, from the bit-map image if it is determined in the determining step that the selection command for selecting the color desired by the user has been issued, or calculating the palette color based on the bit-map image and extracting a partial image, corresponding to the calculated palette color, from the bit-map image if it is determined in the determining step that the calculation command for calculating the palette color has been issued;

program code for converting the partial image extracted in the extracting step into vector data per color object for vectorization to store the vector data onto memory means;

program code for selecting, from the calculated palette colors, the color desired by the user in response to an instruction from the user if it is determined in the determining step that the calculation command for calculating the palette color has been issued; and program code for controlling the vector data per color object to vector data desired by the user if it is determined in the determining step that the selection command for selecting the color desired by the user has been issued, or controlling, to vector data desired by the user, vector data per object selected from the vector data stored in the converting step based on the color selected if it is determined that the calculation command for calculating the palette color has been issued.

19. A storage medium having stored, in computer readable manner, a computer program according to claim 16.

20. A storage medium having stored, in computer readable manner, a computer program according to claim 17.

21. A storage medium having stored, in computer readable manner, a computer program according to claim 18.

22. An image processing system for converting a bit-map image of a plurality of colors into vector data, the image processing system comprising:

selecting unit for selecting a color desired by a user;

extracting unit for extracting a partial image, corresponding to the selected color, from the bit-map image;

vectorization unit for converting the extracted partial image into vector data per color object to store the vector data onto memory means; and control unit for controlling the vector data per color object, stored in the vectorization means, to vector data desired by the user.

23. An image processing system according to claim 22, further comprising color substituting unit for substituting the vector data with a color desired by the user.

* * * * *